(12) United States Patent
Ozawa et al.

(10) Patent No.: US 8,847,977 B2
(45) Date of Patent: Sep. 30, 2014

(54) INFORMATION PROCESSING APPARATUS TO FLIP IMAGE AND DISPLAY ADDITIONAL INFORMATION, AND ASSOCIATED METHODOLOGY

(75) Inventors: Hiroyuki Ozawa, Tokyo (JP); Ryo Takaoka, Tokyo (JP); Ayako Iwase, Kanagawa (JP); Shinichi Iriya, Kanagawa (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 12/479,269

(22) Filed: Jun. 5, 2009

(65) Prior Publication Data

US 2010/0026719 A1   Feb. 4, 2010

(30) Foreign Application Priority Data

Jul. 31, 2008  (JP) ................................. 2008-197215

(51) Int. Cl.
*G09G 5/00* (2006.01)
*G06F 3/0488* (2013.01)
*G06F 3/0483* (2013.01)

(52) U.S. Cl.
CPC .......... *G06F 3/04883* (2013.01); *G06F 3/0483* (2013.01); *G06F 2200/1637* (2013.01)
USPC ........... 345/619; 345/649; 345/672; 345/158; 715/700

(58) Field of Classification Search
CPC ......... G06T 3/60; G06F 1/169; G06F 1/1694; G06F 3/03547; G06F 3/048; G06F 3/04845; G06F 3/0488; G06F 2200/1637
USPC .................................. 345/649, 672; 715/700
See application file for complete search history.

(56) References Cited

U.S. PATENT DOCUMENTS 5,463,725 A * 10/1995 Henckel et al. ................ 715/776
6,115,724 A *  9/2000 Booker ........................ 715/273
(Continued)

FOREIGN PATENT DOCUMENTS

EP    1058181 A1    12/2000
JP    04-280376 A   10/1992
(Continued)

OTHER PUBLICATIONS

Office Action issued Oct. 20, 2011 in Japan Application No. 2009-134665 (With English Translation).

(Continued)

*Primary Examiner* — Michelle L Sams
(74) *Attorney, Agent, or Firm* — Oblon, Spivak, McClelland, Maier & Neustadt, L.L.P.

(57) ABSTRACT

A touch screen includes a display unit and an operation input receiving unit that receives a touch. A display control unit allows a state of display on the display unit to transit from a first state in which an image is displayed as a front side of a card to a second state in which an additional information image is displayed as a rear side of the card. In response to a determination that the operation input receiving unit has detected in the first state that a touched location is a border of the image, an additional information access entrance is displayed at the border. When the operation input receiving unit detects a tracing operation in which the touch moves by a predetermined distance while touching the operation input receiving unit, the tracing operation starting from the additional information access entrance, the state of display is forced to transit.

21 Claims, 14 Drawing Sheets

(56) References Cited

U.S. PATENT DOCUMENTS

| | | | |
|---|---|---|---|
| 6,297,838 B1* | 10/2001 | Chang et al. | 715/863 |
| 6,788,292 B1* | 9/2004 | Nako et al. | 345/173 |
| 2005/0198571 A1* | 9/2005 | Kramer et al. | 715/517 |
| 2006/0026536 A1* | 2/2006 | Hotelling et al. | 715/863 |
| 2006/0092137 A1 | 5/2006 | Lee | |
| 2006/0164382 A1* | 7/2006 | Kulas et al. | 345/156 |
| 2006/0284852 A1 | 12/2006 | Hofmeister et al. | |
| 2007/0146314 A1* | 6/2007 | O'Sullivan | 345/156 |
| 2007/0176898 A1* | 8/2007 | Suh | 345/158 |
| 2007/0247422 A1* | 10/2007 | Vertegaal et al. | 345/156 |
| 2007/0268246 A1* | 11/2007 | Hyatt | 345/156 |
| 2008/0040692 A1 | 2/2008 | Sunday et al. | |
| 2008/0062141 A1 | 3/2008 | Chandhri | |
| 2008/0188210 A1* | 8/2008 | Choi et al. | 455/414.3 |
| 2009/0235162 A1 | 9/2009 | Nuccio et al. | |
| 2010/0037135 A1 | 2/2010 | Iwase et al. | |
| 2010/0053216 A1 | 3/2010 | Iwase et al. | |
| 2010/0053220 A1 | 3/2010 | Ozawa et al. | |
| 2010/0053355 A1 | 3/2010 | Iwase et al. | |
| 2010/0123734 A1 | 5/2010 | Ozawa et al. | |
| 2010/0125786 A1 | 5/2010 | Ozawa et al. | |
| 2010/0145982 A1 | 6/2010 | Iwase et al. | |
| 2010/0241960 A1 | 9/2010 | Iriya et al. | |
| 2010/0310232 A1 | 12/2010 | Iwase et al. | |

FOREIGN PATENT DOCUMENTS

| | | |
|---|---|---|
| JP | 08-106469 A | 4/1996 |
| JP | 09-081103 A | 3/1997 |
| JP | 10-56610 | 2/1998 |
| JP | 2000-163193 | 6/2000 |
| JP | 2000-163193 A | 6/2000 |
| JP | 2000-242390 A | 9/2000 |
| JP | 2003-216300 A | 7/2003 |
| JP | 2003-263144 A | 9/2003 |
| JP | 2006-350669 | 12/2006 |
| JP | 2006-350669 A | 12/2006 |
| JP | 2007-19685 | 1/2007 |
| WO | WO 2007/091298 A1 | 8/2007 |

OTHER PUBLICATIONS

European Search Report dated Feb. 5, 2014 in European Patent Application No. 09166692.5.

* cited by examiner

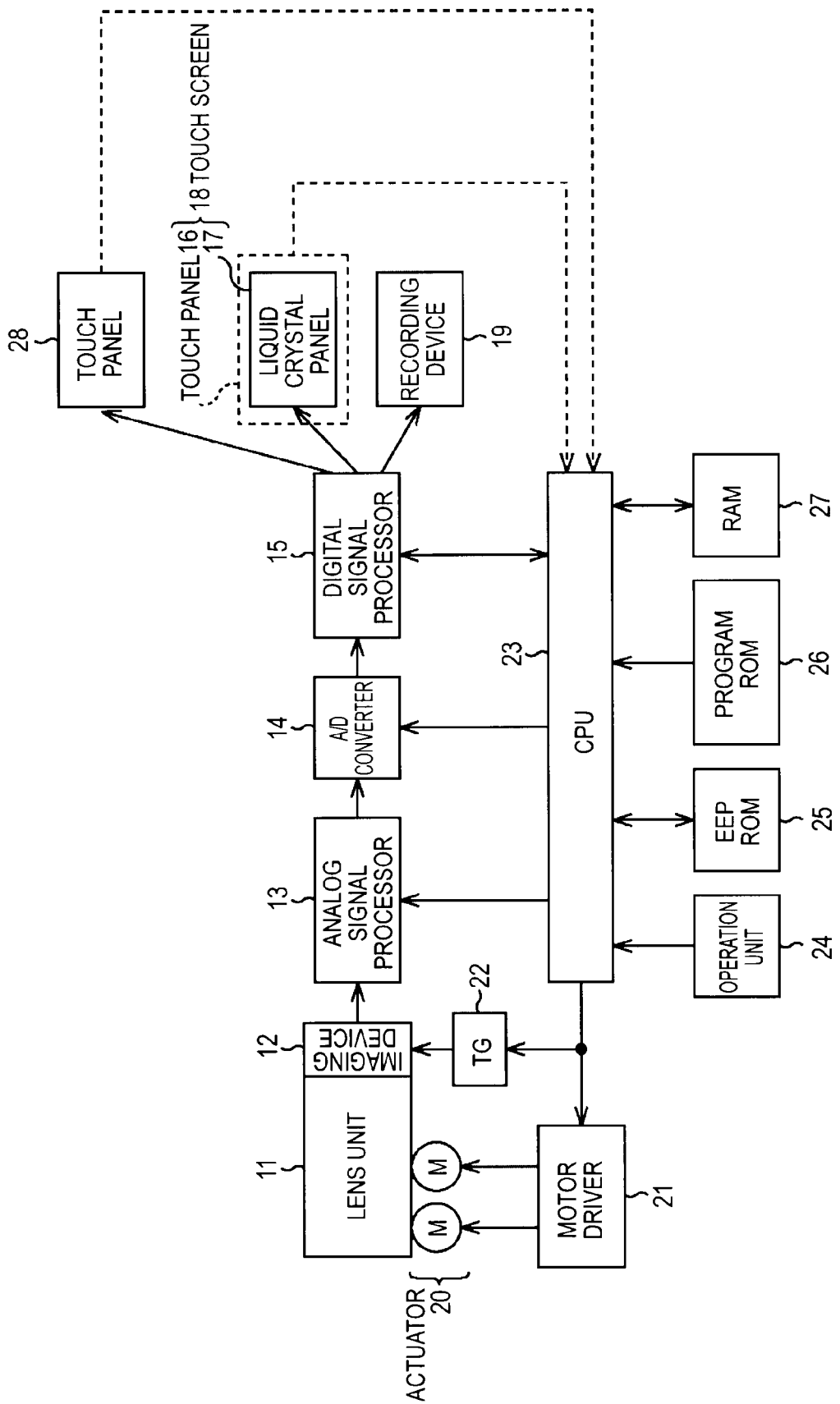

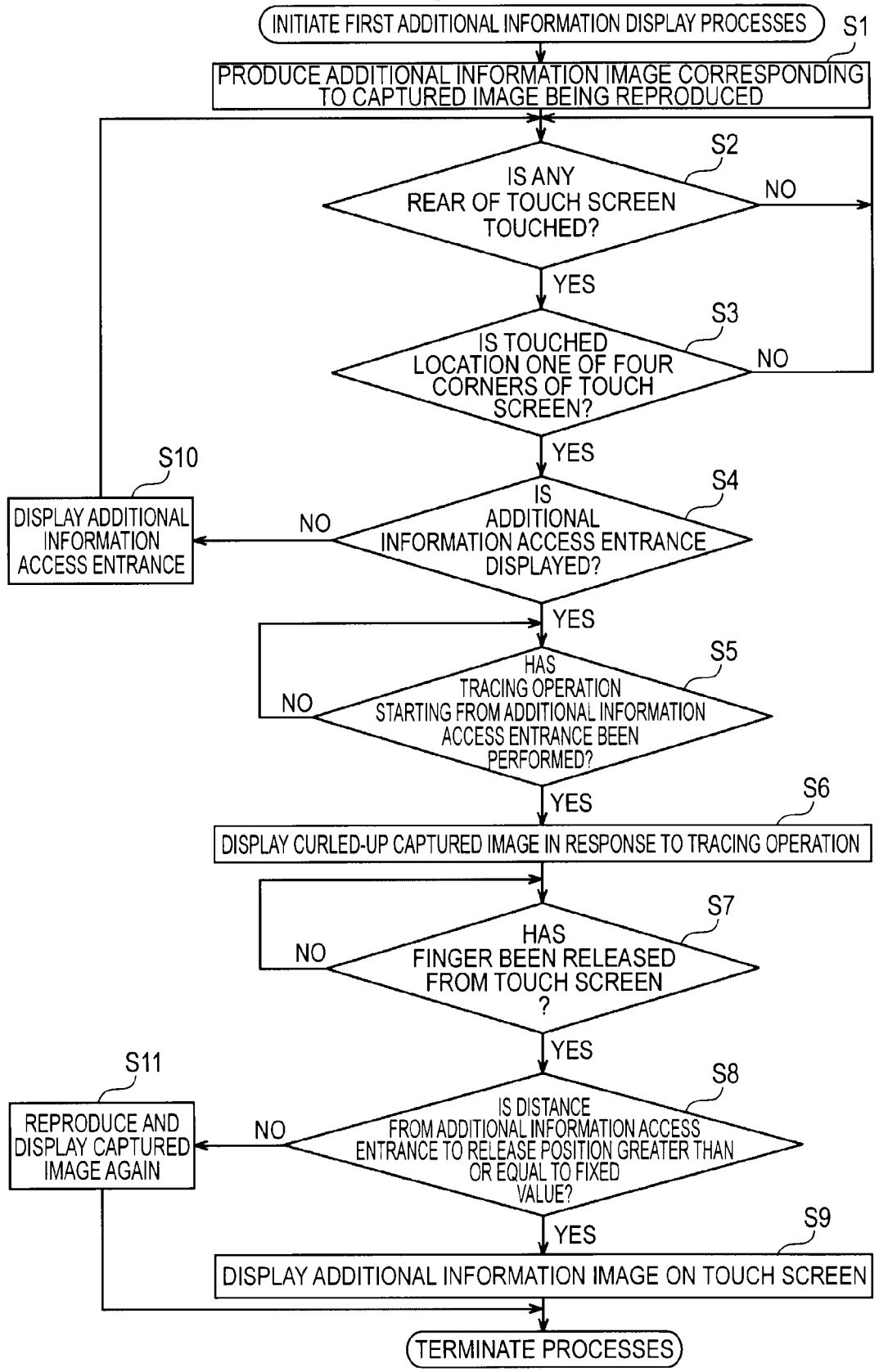

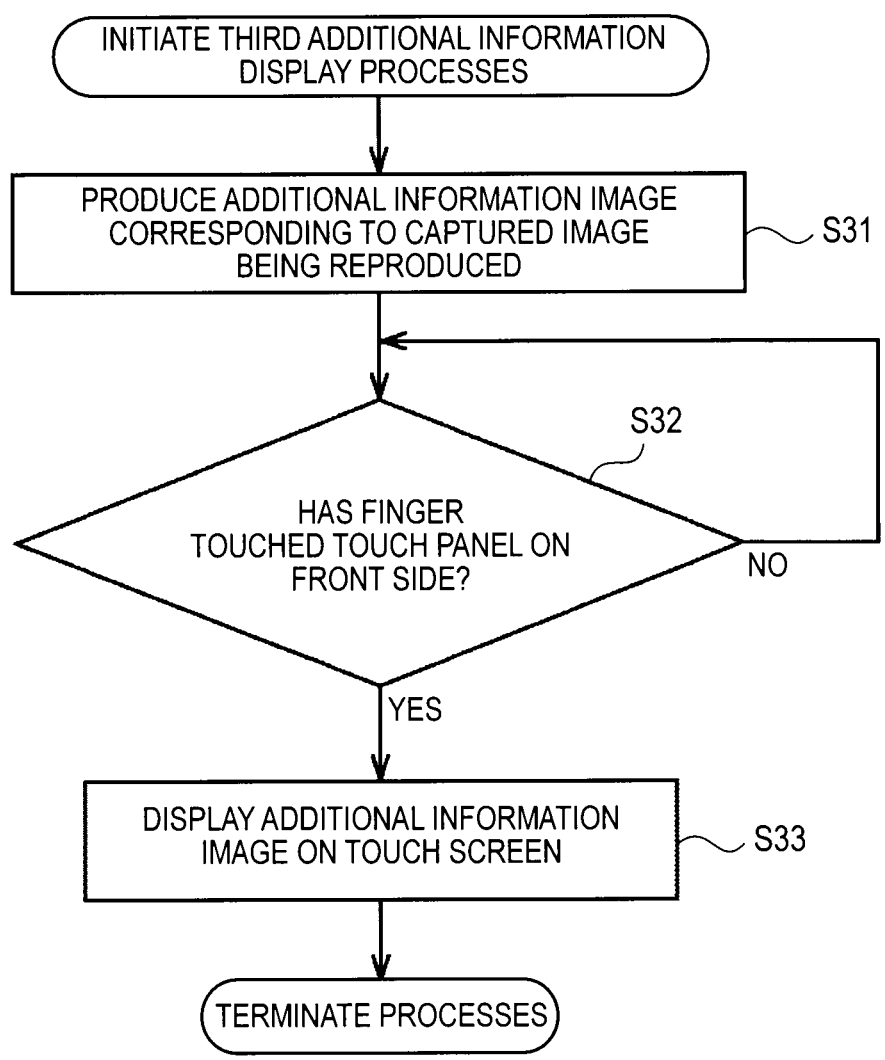

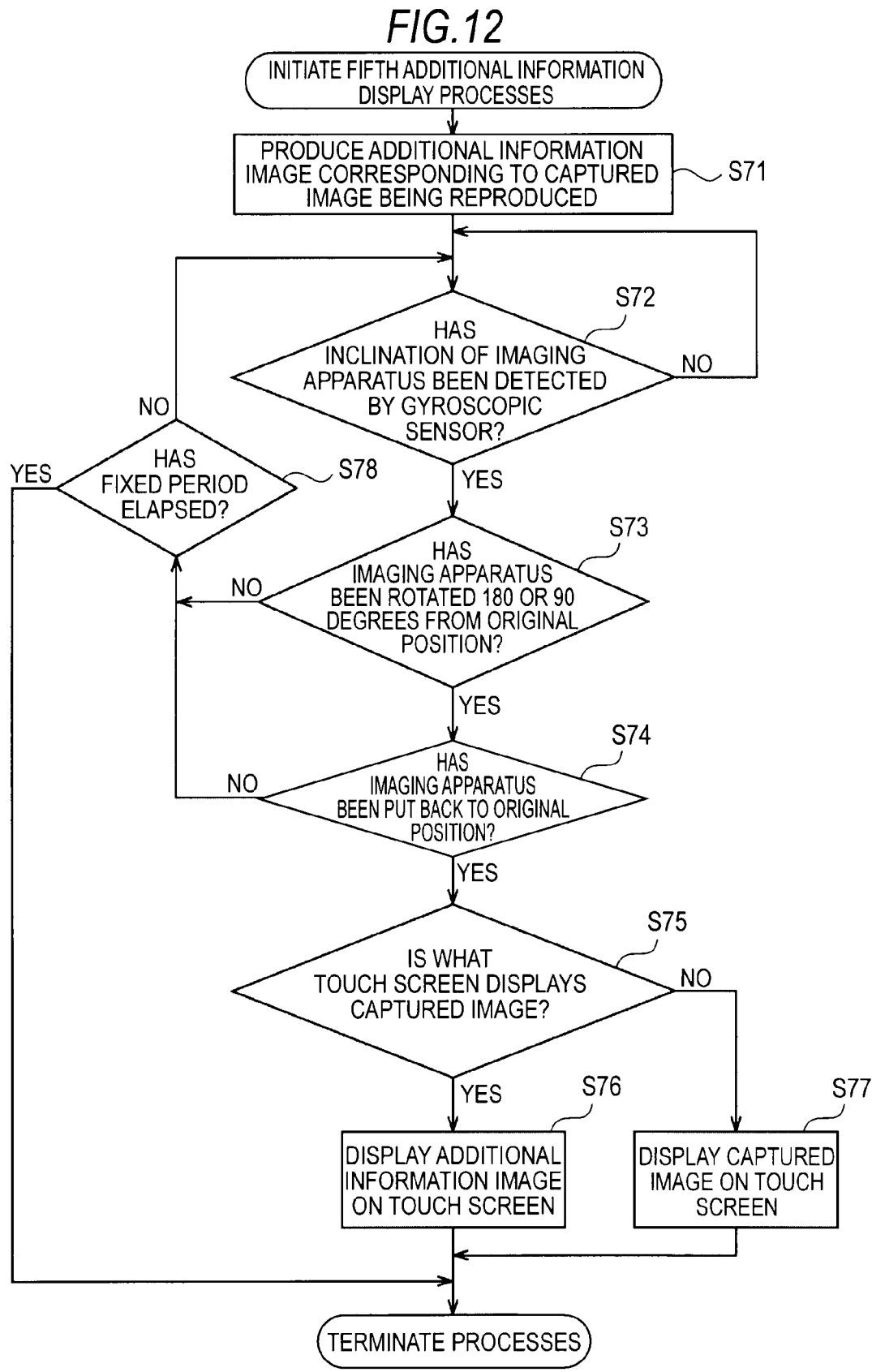

FIG.13A
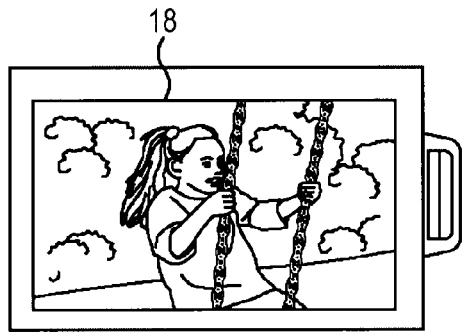
FIG.13B
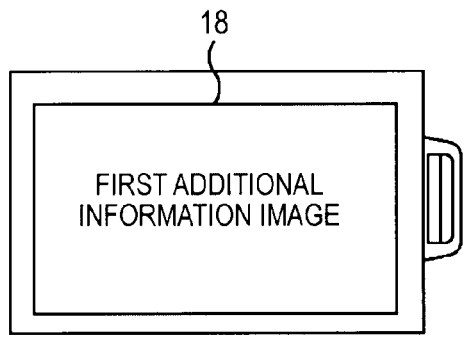
FIG.13D
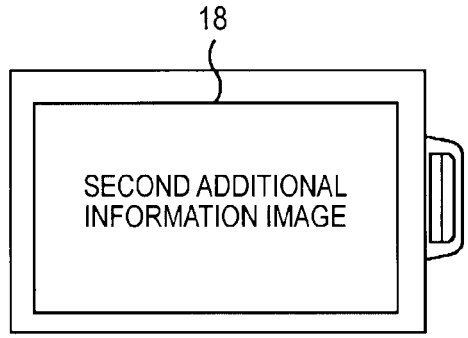
FIG.13C
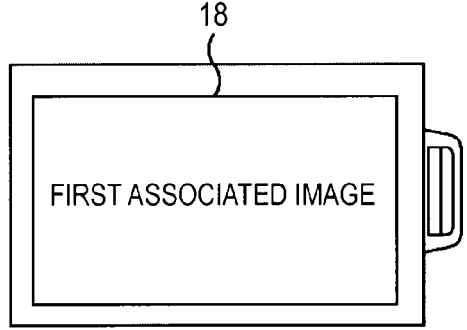
FIG.13E
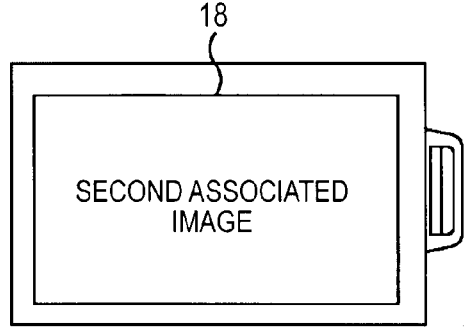

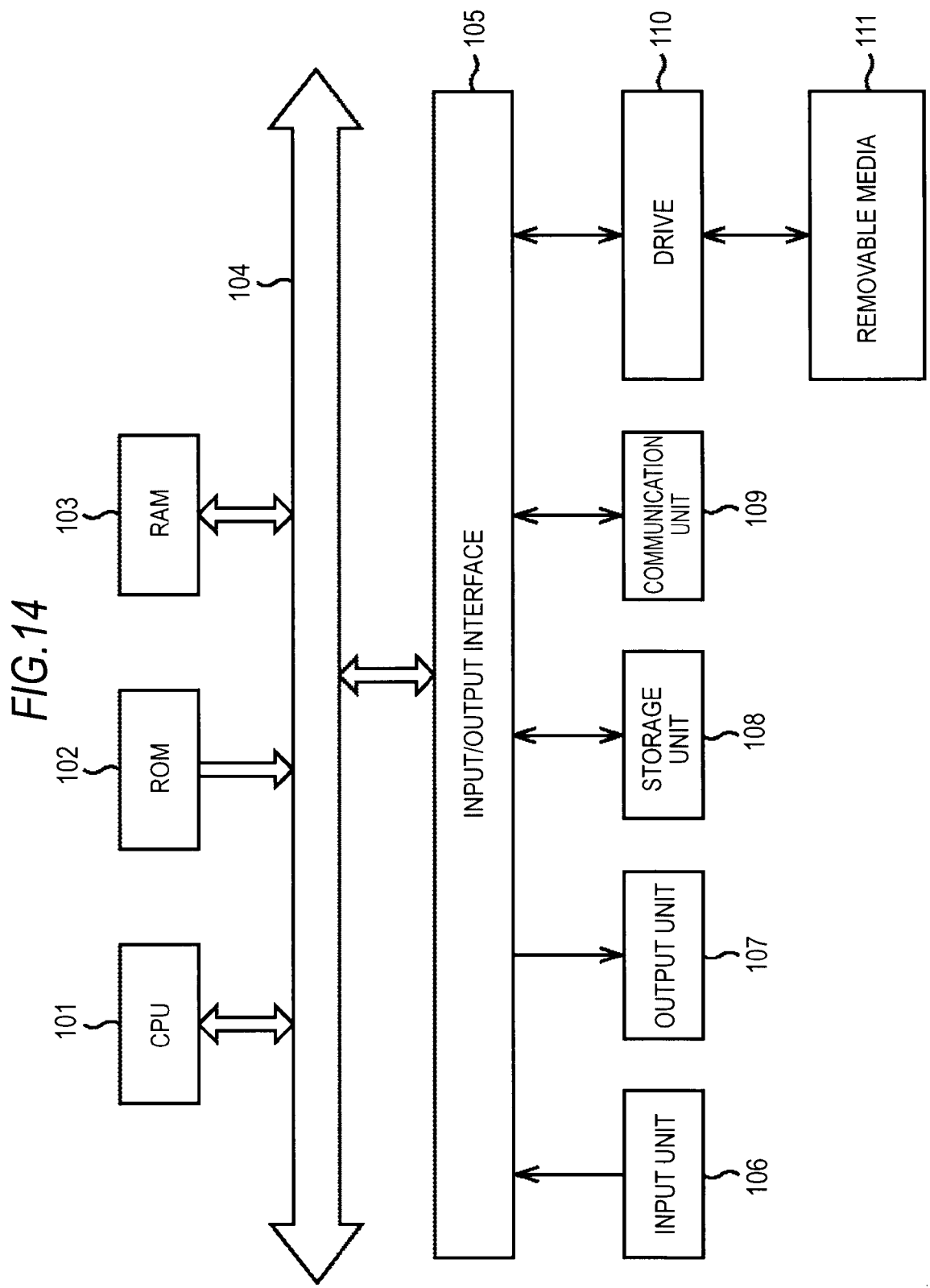

INFORMATION PROCESSING APPARATUS TO FLIP IMAGE AND DISPLAY ADDITIONAL INFORMATION, AND ASSOCIATED METHODOLOGY

BACKGROUND OF THE INVENTION

1. Field of the Invention

The present invention relates to an information processing apparatus, method, and program, and particularly to an information processing apparatus, method, and program capable of easily checking additional information related to a captured image or a recorded image.

2. Description of the Related Art

Images captured with a digital camera (see JP-A-2007-019685, for example) and images recorded in the digital camera are related to information associated with the captured and recorded images (hereinafter referred to as additional information) in some cases. A user, when checking such additional information, has conventionally carried out, for example, the following operations: That is, a digital camera of related art has a dedicated hardware key, such as a DISPLAY button, and a menu. The user operates any of the buttons and other components to display a screen for setting a plurality of functions provided in the digital camera on a liquid crystal panel or any other suitable monitor, and selects a function that provides desired additional information. The user thus visually recognizes the additional information displayed on the liquid crystal panel or any other suitable monitor.

SUMMARY OF THE INVENTION

The operation described above, however, is cumbersome for the user in some cases, and there is a need for an easier additional information checking operation. Further, in recent years, using accessories represented by a GPS (Global Positioning System) and interfacing with the Internet tend to increase the amount of additional information. It has been therefore important to meet the need described above. That is, although there is a need to simplify the operation of displaying additional information on captured images and recorded images (hereinafter referred to as additional information display operation), the need has not so far been satisfied adequately.

Thus, it is desirable to simplify the additional information display operation.

An information processing apparatus according to an embodiment of the invention includes a display unit displaying an image, an operation input receiving unit receiving a user's operation performed on the display unit, and a display control unit carrying out display control when the operation input receiving unit receives a predetermined operation, the display control allowing the state of the display on the display unit to transit from one of a first state of display in which an image is displayed as the front side of a card and a second state of display in which an additional information image including one or more pieces of additional information associated with the image is displayed as the rear side of the card to the other.

The display control unit performs the following control as the display control: when the operation input receiving unit detects in the first state of display that a user's finger touches the operation input receiving unit, an additional information access entrance is further displayed as an image for accessing the additional information at the location corresponding to the touched position, and when the operation input receiving unit detects a tracing operation defined as an operation in which the user moves the finger by a predetermined distance with the finger touching the operation input receiving unit, the tracing operation starting from the additional information access entrance, the state of display on the display unit is forced to transit.

The display control unit further performs the following control as the display control: the rate at which the image is reduced is changed in accordance with the path of the finger in the tracing operation, and the changed captured or recorded image is displayed on the display unit.

The display control unit performs the following control as the display control: when the operation input receiving unit detects that the user is touching a predetermined area for at least a fixed period in the first state of display, the state of the display on the display unit is forced to transit.

The display unit and the operation input receiving unit are disposed on a first surface among the surfaces of the information processing apparatus. The information processing apparatus further includes a touch panel unit including a touch panel disposed on a second surface on the side opposite the first surface. The display control unit performs the following control as the display control: when the touch panel unit detects that the user touches a predetermined area of the touch panel unit with a finger, the state of the display on the display unit is forced to transit.

The information processing apparatus further includes a detection unit detecting the inclination of the information processing apparatus, and the display control unit performs the following control as the display control: when the detection unit detects based on the detection result that the user rotates the information processing apparatus 360 degrees, the state of the display on the display unit is forced to transit.

The information processing apparatus further includes a detection unit detecting the inclination of the information processing apparatus, and the display control unit performs the following control as the display control: when the detection unit detects based on the detection result that the user carries out a first operation of rotating the information processing apparatus 180 or 90 degrees followed by a second operation of rotating the information processing apparatus 180 or 90 degrees in the opposite direction, the state of the display on the display unit is forced to transit.

When the state of the display on the display unit is the first state of display, the display control unit acquires in advance the additional information to be contained in the additional information image before the predetermined operation is detected.

An information processing method and program according to another embodiment of the invention are a method and program corresponding to the information processing apparatus according to the embodiment of the invention described above.

In the information processing method and program according to the another embodiment of the invention, an information processing apparatus including a display unit and an operation input receiving unit carries out the following control: That is, the state of the display on the display unit includes a first state of display in which an image is displayed on the display unit as the front side of a card and a second state of display in which an additional information image including one or more pieces of additional information associated with the image is displayed on the display unit as the rear side of the card. In this case, when a predetermined operation is detected, the state of the display on the display unit to transit transits from one of the first and second states of display to the other.

As described above, the invention allows the additional information display operation to be simplified.

BRIEF DESCRIPTION OF THE DRAWINGS

FIG. 1 is a block diagram showing an exemplary configuration of an imaging apparatus as an embodiment of an information processing apparatus to which the invention is applied;

FIG. 4 is a flowchart describing an example of first additional information display processes;

FIG. 8 is a flowchart describing an example of third additional information display processes;

FIG. 12 is a flowchart describing an example of fifth additional information display processes;

FIGS. 13A to 13E describe an example of an operation of setting basic functions; and FIG. 14 is a block diagram showing an exemplary configuration of an information processing apparatus to which the invention is applied, which is different from the configuration shown in FIG. 1.

DESCRIPTION OF THE PREFERRED EMBODIMENTS

Figure 2A:
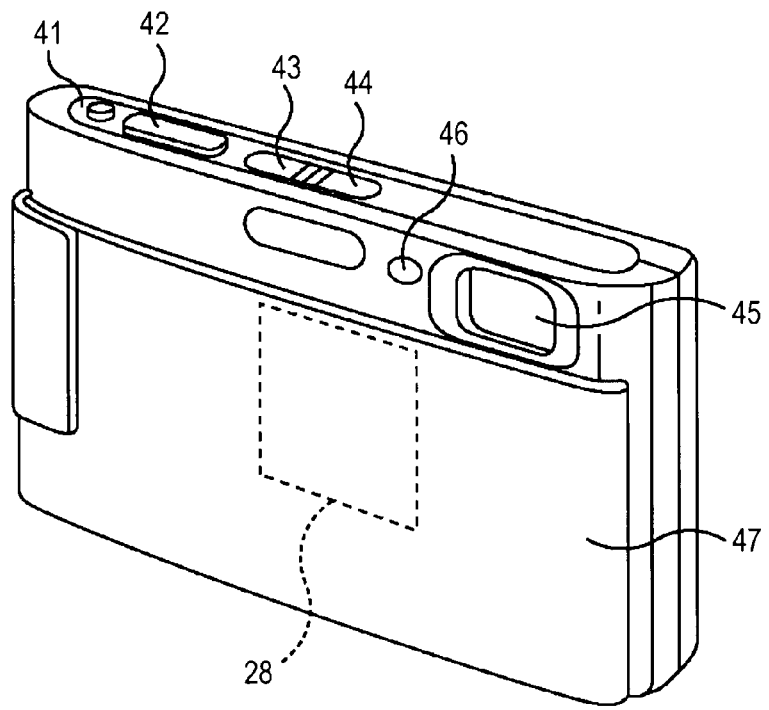
FIGS. 2A and 2B are perspective views showing an exemplary exterior configuration of the imaging apparatus shown in FIG. 1.

An embodiment of the invention will be described below with reference to the drawings.

FIG. 1 is a block diagram showing an exemplary configuration of an imaging apparatus as an embodiment of an information processing apparatus to which the invention is applied.

In the example shown in FIG. 1, the imaging apparatus includes a lens unit 11 through a touch panel 28.

The lens unit 11 includes such as an imaging lens, a diaphragm, and a focus lens. An imaging device 12, such as a CCD (Charge Coupled Device), is disposed on the optical path along which subject light incident through the lens unit 11 travels.

The imaging device 12, an analog signal processor 13, an A/D (Analog/Digital) converter 14, and a digital signal processor 15 are connected to each other in this order.

The digital signal processor 15 is connected to a liquid crystal panel 17, a recording device 19, and a touch panel 28.

The lens unit 11 is connected to an actuator 20 for adjusting the diaphragm, which is part of the lens unit 11, and moving the focus lens, which is part of the lens unit 11. The actuator 20 is also connected to a motor driver 21. The motor driver 21 drives and controls the actuator 20.

A CPU (Central Processing Unit) 23 controls the entire imaging apparatus. To this end, the CPU 23 is connected to the analog signal processor 13, the A/D converter 14, the digital signal processor 15, the motor driver 21, a TG (Timing Generator) 22, an operation unit 24, an EEPROM (Electrically Erasable Programmable ROM) 25, a program ROM (Read Only Memory) 26, a RAM (Random Access Memory) 27, a touch panel 16, and the touch panel 28.

A touch screen 18 includes the touch panel 16 and the liquid crystal panel 17. The touch panel 28 is disposed on the opposite side of the imaging apparatus to the touch screen 18, that is, on the imaging lens side (see FIGS. 2A and 2B, which will be described later).

The recording device 19 is formed of, for example, a DVD (Digital Versatile Disc) or any other similar optical disc, a memory card or any other similar semiconductor memory, or any other similar removable recording medium. The recording device 19 can be freely attached and detached to and from a body of the imaging apparatus.

The EEPROM 25 stores a variety of types of information that has been set. The EEPROM 25 further stores other information, for example, information that should be held when the power is turned off.

The program ROM 26 stores programs to be executed by the CPU 23 and data necessary for the CPU 23 to execute the programs.

The RAM 27 serves as a work area used when the CPU 23 carries out a variety of processes, and temporarily stores necessary programs and data.

The actions of the entire imaging apparatus having the configuration shown in FIG. 1 will be described below in summary.

The CPU 23 controls the components that form the imaging apparatus by executing the programs recorded in the program ROM 26. The CPU 23 carries out predetermined processes in response to signals from the touch panel 16 or the touch panel 28 and signals from the operation unit 24. Specific examples of the processes will be described later with reference to the flowcharts shown in FIGS. 4, 6, 8, and 12.

A user operates the operation unit 24, which in turn provides the CPU 23 with a signal corresponding to the operation.

That is, the touch screen 18 or the touch panel 28, when touched, for example, by a finger at an arbitrary position, that is, when the user carries out a predetermined input operation, detects the coordinates of the touched position. An electric signal representing the detected coordinates (hereinafter referred to as a coordinate signal) is sent to the CPU 23. The CPU 23 derives the coordinates of the touched position from the coordinate signal, acquires predetermined information related to the coordinates, and carries out a predetermined process based on the information.

The touch used herein includes not only static touch (touching only a single predetermined area) but also dynamic touch (touch that occurs when a finger or any other object follows a predetermined path). For example, flipping a sheet on an image or any other similar tracing operation performed by a finger is one form of touch.

The actuator 20 is driven to pull the lens unit 11 out of a housing of the imaging apparatus and push the lens unit 11 into the housing. Further, the actuator 20 is driven to adjust the diaphragm, which is part of the lens unit 11, and move the focus lens, which is part of the lens unit 11.

The TG 22 provides the imaging device 12 with a timing signal under the control of the CPU 23. The timing signal controls the exposure period and other parameters in the imaging device 12.

The imaging device 12 operates based on the timing signal provided from the TG 22 and receives subject light incident through the lens unit 11, and the subject light then undergoes photoelectric conversion. The imaging device 12 then provides the analog signal processor 13 with an analog image signal according to the amount of received light. In this process, the motor driver 21 drives the actuator 20 under the control of the CPU 23.

The analog signal processor 13 carries out amplification and other analog signal processing on the analog image signal provided from the imaging device 12. The analog signal processor 13 provides the A/D converter 14 with the resultant analog image signal.

The A/D converter 14 converts the analog image signal from the analog signal processor 13 into a digital image signal under the control of the CPU 23. The A/D converter 14 provides the digital signal processor 15 with the resultant digital image signal.

The digital signal processor 15 carries out noise removal and other digital signal processing on the digital image signal provided from the A/D converter 14 under the control of the CPU 23. The digital signal processor 15 displays an image corresponding to the digital image signal as a captured image on the liquid crystal panel 17.

Further, the digital signal processor 15 compresses and encodes the digital image signal provided from the A/D converter 14 in accordance with a predetermined compression and encoding scheme, for example, JPEG (Joint Photographic Experts Group). The digital signal processor 15 records the compressed and encoded digital image signal in the recording device 19.

The digital signal processor 15 also reads the compressed and encoded digital image signal from the recording device 19 and decompresses and decodes the signal in accordance with a decompression and decoding scheme corresponding to the predetermined compression and encoding scheme. The digital signal processor 15 displays an image corresponding to the digital image signal as a recorded image on the liquid crystal panel 17.

Additionally, the digital signal processor 15 produces a frame image used to perform an AF (auto focus) function (hereinafter referred to as an AF frame) on the liquid crystal panel 17 under the control of the CPU 23.

That is, an image captured by the imaging device 12 (captured image) is displayed on the liquid crystal panel 17. In this case, the AF frame is set on the image displayed on the liquid crystal panel 17. The focus control is carried out based on the image within the AF frame.

As described above, the imaging apparatus has the AF function. The AF function includes not only the focus control function but also the function of setting the AF frame in an arbitrary position on the image displayed on the liquid crystal panel 17. The AF function further includes a function of controlling the position, the size, and other parameters of the AF frame only by operating the touch screen 18 formed of the liquid crystal panel 17 and the touch panel 16.

To perform the AF function, the CPU 23 reads a program in the program ROM 26 and executes the program. The imaging apparatus further has an AE (Automatic Exposure) function and an AWB (Auto White Balance) function. These functions are also performed by instructing the CPU 23 to read programs in the program ROM 26 and execute them.

More specifically, the AF function, the AE function, and the AWB function are presented only by way of example of the functions provided in the imaging apparatus. That is, the imaging apparatus has a variety of imaging-related functions. In the following description, among the variety of functions, imaging-related basic functions are referred to as basic functions, and imaging-related application functions are referred to as application functions. The basic functions include not only the AF function, the AE function, and the AWB function but also an "imaging mode selection function" and an "imaging timer setting function." The application functions include a "pixel number changing function" and a "color adjusting function."

Figure 2B:
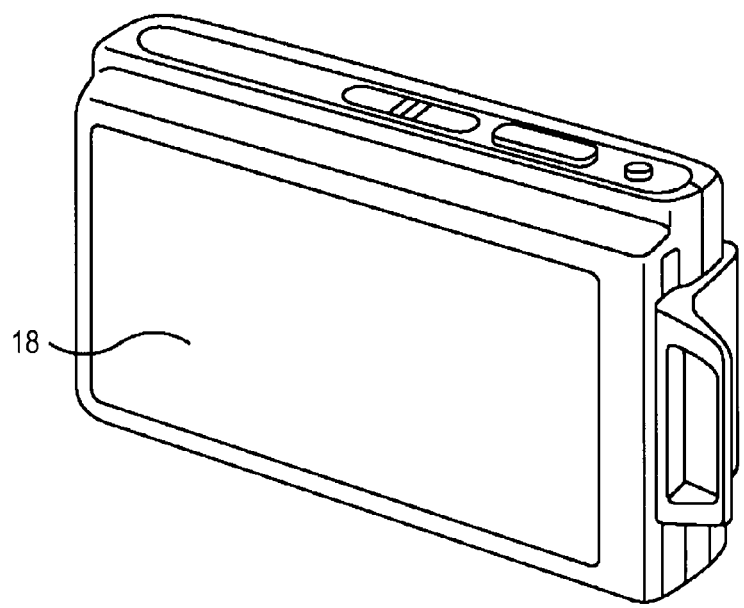

FIGS. 2A and 2B are perspective views showing an exemplary exterior configuration of the imaging apparatus in the example shown in FIG. 1.

In the following description, among the surfaces of the imaging apparatus, the surface facing a subject to be imaged by the user, that is, the surface on which the lens unit 11 is disposed, is referred to as a front surface. On the other hand, among the surfaces of the imaging apparatus, the surface facing the user who images the subject, that is, the surface opposite the front surface, is referred to as a rear surface. Among the surfaces of the imaging apparatus, the surface disposed on the upper side and the surface disposed on the lower side when the user images the subject are referred to as an upper surface and a lower surface, respectively.

FIG. 2A is a perspective view showing an exemplary exterior configuration of the front surface of the imaging apparatus, and FIG. 2B is a perspective view showing an exemplary exterior configuration of the rear surface of the imaging apparatus.

The front surface of the imaging apparatus can be covered with a lens cover 47. FIG. 2A shows the state after the lens cover 47 on the front surface is slid downward and opened. As shown in FIG. 2A, an imaging lens 45 incorporated in the lens unit 11 and an AF illuminator 46 are disposed in this order in the right-to-left direction in an upper front portion from which the lens cover 47 is removed. The touch panel 28 is disposed in a lower front portion covered with the lens cover 47. Specifically, the portion where the touch panel 28 is disposed is a central portion of the imaging apparatus or the vicinity thereof where the user does not hold the imaging apparatus when the user images a subject.

The AF illuminator 46 also serves as a self-timer lamp. On the upper surface of the imaging apparatus are disposed a zoom lever (TELE/WIDE) 41, a shutter button 42, a playback button 43, and a power button 44 in this order from the left-to-right direction in FIG. 2A. The zoom lever 41, the shutter button 42, the playback button 43, and the power button 44 are part of the operation unit 24 shown in FIG. 1.

As shown in FIG. 2B, the touch screen 18 is disposed over the rear surface of the imaging apparatus.

Since the touch screen 18 is thus disposed on the rear surface of the imaging apparatus, the user, when imaging a subject, can operate a GUI (Graphical User Interface) using the touch screen 18 with the front surface of the imaging apparatus remaining facing the subject.

In the present embodiment, for example, an additional information display operation can be carried out as an operation through the GUI using the touch screen 18.

A first example of the additional information display operation of the present embodiment will be described with reference to FIGS. 3A to 3E.

Figure 3A:
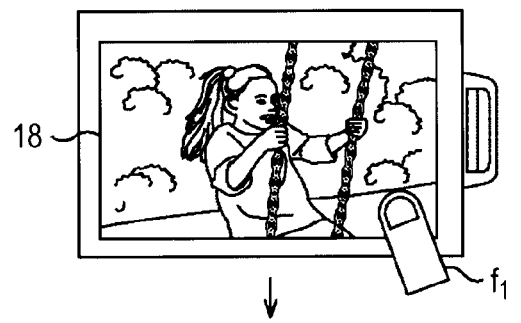
FIGS. 3A to 3E describe a first example of an additional information display operation in the imaging apparatus.

FIG. 3A shows a state in which the touch screen 18 displays an arbitrary captured or recorded image. In the following description, displaying a captured image on the touch screen 18 is expressed as reproducing a captured image. The following description will be made by focusing attention on reproducing a captured image. It is noted that an operation that is basically the same as the additional information display operation, which will described below, can be applied to recorded images. This holds true not only in the first example but also in the other examples.

Figure 3B:
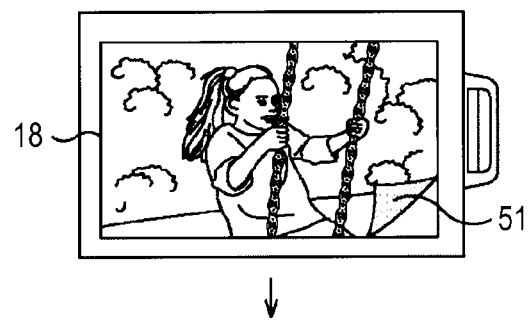

In the state shown in FIG. 3A, when the user's finger f1 touches a lower right area of the captured image reproduced on the touch screen 18, the state of the display on the touch screen 18 transits to the state shown in FIG. 3B. That is, the state of the display on the touch screen 18, specifically, the state of the display on the lower right area changes in such a way that an area 51 in the captured image is curled up as shown in FIG. 3B. The apparently curled-up area 51 in the captured image is hereinafter referred to as an additional information access entrance 51.

The imaging apparatus, which displays the additional information access entrance 51, can cause the user to naturally feel, for example, that "I want to do something about the curled-up portion" or "there may be something on the rear side of the card."

The displayed form of the additional information access entrance 51 is not particularly limited to that shown in FIG. 3B, that is, the curled-up form. For example, an image containing a message saying "See also the rear side" can be used as the additional information access entrance 51.

Figure 3C:
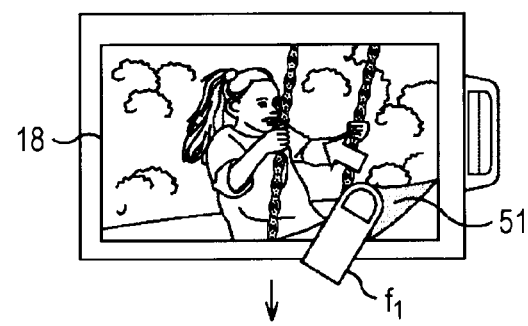

In the state of the display on the touch screen 18 as shown in FIG. 3B, the user touches the additional information access entrance 51 with the finger f1 as shown in FIG. 3C. The user moves the finger f1 from the additional information access entrance 51 by a predetermined distance in a predetermined direction, while the finger f1 remains touching the touch screen 18. The above action is hereinafter referred to as a tracing operation.

Figure 3D:
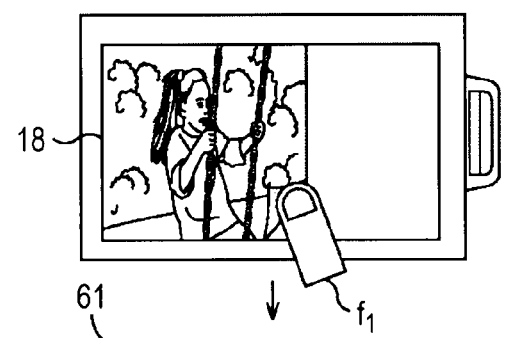

When the user performs a tracing operation in a substantially horizontal direction in the state shown in FIG. 3C, the state of the display on the touch screen 18 transits to the state shown in FIG. 3D.

That is, the CPU 23 controls the digital signal processor 15 to change the rate at which the captured image is reduced in size as the finger f1 traces the path and successively displays images reduced in size on the touch screen 18. In this way, the touch screen 18 displays moving images displayed as if the user turned over a single card, which is the captured image, as shown in FIG. 3D.

Alternatively, animation processes may be used to express an image being reduced in size at a varying rate, that is, a single card (captured image) apparently being turned over by the user.

The processes carried out by the CPU 23 are similarly carried out in other GUI operations, which will be described later. That is, when moving images are displayed on the touch screen 18 in the following description, moving image producing processes or animation processes are carried out as appropriate but description thereof will be omitted.

Figure 3E:
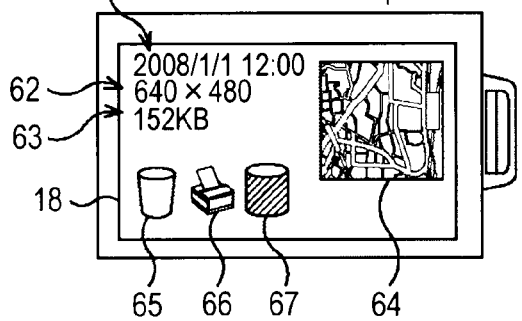

When a tracing operation is performed along at least a fixed distance in the state of the display shown in FIG. 3D, the state of the display on the touch screen 18 transits to a state in which additional information on the captured image is displayed, as shown in FIG. 3E. An image having additional information on a captured image displayed is hereinafter referred to as an additional information image. As described above, when a captured image displayed on the touch screen is considered as a single card (photo), an image mimicking the rear side of the card is an additional information image. That is, in the real life, the user often writes additional information associated with a card (photo) on the rear side of the card. An image mimicking the rear side is an additional information image. As additional information written on the rear side of a card in the real life may vary from user to user, that is, may be arbitrary information, the additional information contained in an additional information image is not limited to specific information but may be arbitrary information.

The additional information image in the example shown in FIG. 3E contains, as the additional information, the date and time 61 when the captured image was captured, the file size 62, the image resolution 63, and location information 64.

The location information 64 represents the location where the captured image is captured. The displayed form of the location information 64 is not limited to a specific one. The location information 64 may be displayed in the form of text or in the form of map as shown in FIG. 3E.

The additional information described above, that is, the date and time 61 when the captured image was captured, the file size 62, the image resolution 63, the location information 64, and other information, indicates a variety of environmental and recording conditions when the captured image was captured, and is related to the captured image data before stored. Therefore, the additional information described above is hereinafter collectively referred to as imaging condition information.

The imaging condition information is, when a captured image is printed on a card (one side of a paper medium), what the user can write down on the rear side of the card (the rear side of the paper medium).

In other words, after a captured image is printed on a paper medium, imaging condition information described above has conventionally been written on the rear side of the paper medium. In contrast, in the present embodiment, the imaging condition information is contained in the additional information image related to the captured image without having to print the captured image on a paper medium. Therefore, the user can display the additional information image on the touch screen 18 and visually recognize the imaging condition information as if the user flipped the card (captured image) and looked at the rear side of the card only by performing a tracing operation on the touch screen 18 of the imaging apparatus.

It is noted that displaying an additional information image on the touch screen 18 means that the user can operate the additional information image.

For example, it is therefore also possible to produce an additional information image in such a way that the imaging apparatus performs a predetermined function when a predetermined operation is performed on the location information 64.

For example, as shown in FIG. 3E, when the location information 64 is displayed in the form of a map, and a predetermined location in the map is specified, the imaging apparatus can be designed to perform a function of storing the information on the specified location as peripheral information. Alternatively, when the display range is shifted, the imaging apparatus can be designed to perform a function of changing the range of the map displayed in the additional information image.

For example, an additional information image can further contain, for example, symbols (such as icons and software buttons) that allow a variety of operations to be carried out. Specifically, for example, a trash icon 65, a printer icon 66, and a server icon 67 are contained in the additional information image in the example shown in FIG. 3E.

The trash icon 65 instructs the imaging apparatus to perform a function of deleting a captured image. That is, the user can delete a captured image corresponding to an additional information image by using the finger f1 to carry out a predetermined operation on the trash icon 65.

The printer icon 66 instructs the imaging apparatus to perform a function of printing a captured image. That is, the user can print a captured image corresponding to an additional information image by using the finger f1 to carry out a predetermined operation on the printer icon 66.

The server icon 67 instructs the imaging apparatus to perform a function of uploading a captured image to a server on a network. That is, the user can upload a captured image corresponding to an additional information image to the server on the network by using the finger f1 to carry out a predetermined operation on the server icon 67.

The information displayed on an additional information image may be information associated with a captured image at the time of imaging or information arbitrarily inputted by the user.

By carrying out the exemplary operation having described with reference to FIGS. 3A to 3E, that is, the operation in the first example of the additional information display operation of the present embodiment, the user can have a feeling similar to that obtained as if the user flipped a photo (the front side of a card as a captured image in the present embodiment) and looked at a memorandum on the rear side (the rear side of the card as the additional information in the present embodiment).

In the above description, the start point of the tracing operation is assumed to be a lower right area of the touch screen 18, as shown in the example in FIGS. 3A to 3E. The start point of the tracing operation is not, however, limited to that in the example shown in FIGS. 3A to 3E. For example, one of the four corners of the touch screen 18 can be used as the start area of a tracing operation.

A description will be made of processes carried out by the imaging apparatus shown in FIG. 1 to perform the exemplary operation described with reference to FIGS. 3A to 3E, that is, the operation in the first example of the additional information display operation of the present embodiment. The processes carried out by the imaging apparatus to perform the additional information display operation of the present embodiment are hereinafter referred to as additional information display processes. In particular, the additional information display processes carried out to perform the operation in the K-th example (K is an integer greater than or equal to one) of the additional information display operation of the present embodiment are referred to as K-th additional information display processes.

FIG. 4 is a flowchart describing an example of first additional information display processes.

Among the states of the imaging apparatus actions, the state in which a captured image is reproduced on the touch screen 18, that is, the state in which the user can view a captured image, is referred to as a captured image reproduced state. It is assumed that the first additional information display processes are initiated when the state of the imaging apparatus action transits to the captured image reproduced state. Further, the first additional information display processes are forcibly terminated not only when the processes described in the flowchart are normally completed, but also when the state of the imaging apparatus action transits from the captured image reproduced state to another state or when the captured image being reproduced changes to another image. The assumptions described above similarly apply to second to fifth additional information display processes, which will be described later.

In the step S1, the CPU 23 controls the digital signal processor 15 and other components as appropriate to produce an additional information image corresponding to a captured image being reproduced. That is, the additional information contained in the additional information image is acquired.

The additional information image only needs to be produced by the time when the process in the step S9 is initiated. That is, the timing at which the additional information image is produced is not, in particular, necessarily the timing at which the step S1 is carried out.

In the step S2, the CPU 23 judges whether or not any area of the touch screen 18 is touched.

When none of the areas of the touch screen 18 is touched, the judgment in the step S2 is NO and the control returns to the process in the step S2. That is, the judgment process in the step S2 is repeated until any area of the touch screen 18 is touched.

Thereafter, when any area of the touch screen 18 is touched, the judgment in the step S2 is YES and the control proceeds to the process in the step S3.

In the step S3, the CPU 23 judges whether or not the touched location is one of the four corners of the touch screen 18.

For example, when the finger f1 touches any area of the touch screen 18 as shown in FIG. 3A, the touch panel 16, which forms the touch screen 18, inputs a coordinate signal to the CPU 23.

Therefore, when the coordinate signal is inputted to the CPU 23, the CPU 23 judges that the result of the process in the step S2 is YES and derives the touched location (the coordinates on the touch screen 18) from the coordinate signal.

When the derived touched location is none of the four corners of the touch screen 18, the judgment in the step S3 is NO and the control returns to the process in the step S2. Thereafter, the process in the step S2 and the following processes are repeated.

On the other hand, when the derived touched location is any of the four corners of the touch screen 18, the judgment in the step S3 is YES and the control proceeds to the process in the step S4.

In the step S4, the CPU 23 judges whether or not the additional information access entrance 51 is displayed on the touch screen 18.

When the additional information access entrance 51 is not displayed, the judgment in the step S4 is NO and the control proceeds to the process in the step S10.

In the step S10, the CPU 23 controls the digital signal processor 15 to display the additional information access entrance 51 on the touch screen 18. The additional information access entrance 51 is displayed in an area of the touch screen 18 that contains the touched location, that is, at any of the four corners of the touch screen 18. For example, when the finger f1 has touched the lower right one of the four corners of the touch screen 18 as shown in FIG. 3A, that is, when the touched location is a lower right area, the additional information access entrance 51 is displayed in the lower right area as shown in FIG. 3B.

The control then returns to the process in the step S2, and the process in the step S2 and the following processes are repeated. In this state, when the finger f1 keeps touching the additional information access entrance 51, the results of judgment in the processes in the steps S2, S3, and S4 are all YES, and the control proceeds to the process in the step S5.

In the step S5, the CPU 23 judges whether or not a tracing operation starting from the additional information access entrance 51 displayed on the touch screen 18 has been performed.

For example, in the state shown in FIG. 3C, that is, when the finger f1 touches the additional information access entrance 51, it is judged whether or not a substantially leftward tracing operation has been performed on the touch screen 18.

Judging whether or not a tracing operation is being performed can be made by using the CPU 23 to monitor the coordinate signal from the touch panel 16, which forms the touch screen 18. That is, the CPU 23 can recognize the path of the finger f1 by using the time-series coordinate signals. The CPU 23 then detects whether or not a tracing operation is being performed based on the recognition result.

Therefore, when the CPU 23 detects no tracing operation from the result of the recognition of the path of the finger f1, the judgment in the step S5 is NO and the control returns to the process in the step S5. The process in the step S5 and the following processes are then repeated. That is, the judgment process in the step S5 is repeated until a tracing operation is detected.

Thereafter, when the CPU 23 examines the result of the recognition of the path of the finger f1 and detects a tracing operation starting from the additional information access entrance 51, the judgment in the step S5 is YES and the control proceeds to the process in the step S6.

In the step S6, the CPU 23 displays a curled-up captured image in response to the tracing operation. Specifically, for example, the CPU 23 controls the digital signal processor 15 to shrink the captured image in the horizontal direction in accordance with the path of the finger f1, as shown in FIG. 3D, and display the shrinking image on the touch screen 18. Alternatively, animation processes may be used to express a curling-up captured image. The control then proceeds to the process in the step S7.

In the step S7, the CPU 23 judges whether or not the finger f1 has been released from the touch screen 18. That is, the tracing operation is defined as an operation in which the finger f1 is moved over the touch screen 18 with the touch between the finger f1 and the touch screen 18 maintained. Therefore, the tracing operation is completed when the user releases the finger f1 from the touch screen 18. When no coordinate signal is inputted any more from the touch panel 16, which forms the touch screen 18, the CPU 23 can judge that the finger f1 has been released.

The CPU 23 judges that the result of the process in the step S7 in NO as long as it keeps receiving a coordinate signal, and returns the control to the process in the step S7. That is, the loop process in the step S7 is repeated as long as a tracing operation continues.

Thereafter, when the coordinate signal is not inputted any more, that is, the tracing operation is completed, the judgment in the step S7 is YES and the control proceeds to the process in the step S8.

In the step S8, the CPU 23 judges whether or not the distance from the additional information access entrance 51 to the release position is greater than or equal to a fixed value.

When the distance from the additional information access entrance 51 to the release position is greater than or equal to the fixed value, the judgment in the step S8 is YES and the control proceeds to the process in the step S9.

In the step S9, the CPU 23 displays the additional information image on the touch screen 18. As a result, the state of the display on the touch screen 18 becomes, for example, that shown in FIG. 3E. The first additional information display processes are completed at this point.

On the other hand, when the distance from the additional information access entrance 51 to the release position is smaller than the fixed value, the judgment in the step S8 is NO and the control proceeds to the process in the step S11.

In the step S11, the CPU 23 reproduces and displays the captured image again. The first additional information display processes are completed at this point.

In the state of the display shown in FIG. 3E, that is, when the additional information image is displayed on the touch screen 18, the CPU 23 can switch the display on the touch screen 18 from the additional information image to the captured image, that is, the CPU 23 can change the display on the touch screen 18 back to the state of the display shown in FIG. 3A, by carrying out the same processes as the first additional information display processes.

The first example of the additional information display operation of the present embodiment has been described with reference to FIGS. 3A to 3E. An example of the first additional information display processes in the first example has been described with reference to the flowchart shown in FIG. 4.

A second example of the additional information display operation of the present embodiment will be described with reference to FIGS. 5A to 5C. An example of second additional information display processes in the second example will be then described with reference to the flowchart shown in FIG. 6.

Figure 5A:
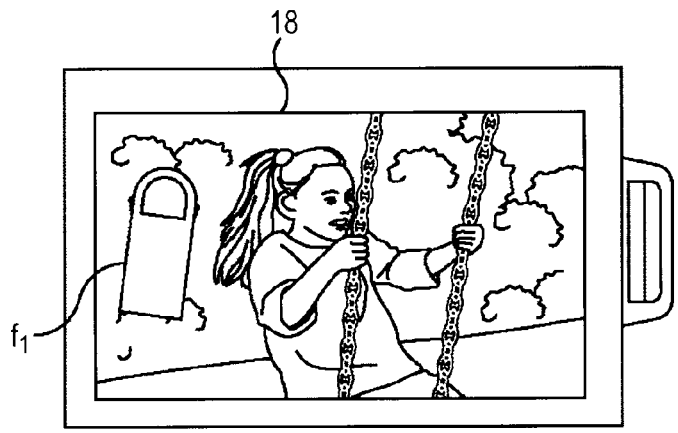
FIGS. 5A to 5C describe a second example of the additional information display operation in the imaging apparatus.

FIG. 5A shows a state in which the touch screen 18 displays an arbitrary captured image.

Figure 5B:
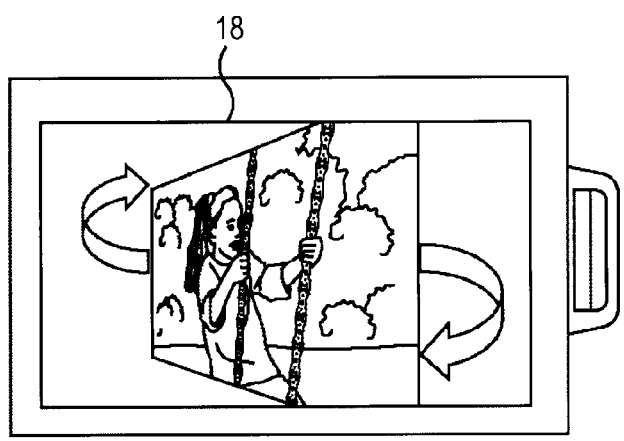

In the state shown in FIG. 5A, when the user's finger f1 touches a left area of the captured image reproduced on the touch screen 18, the display on the touch screen 18 transits to the state shown in FIG. 5B. That is, the reproduced image is displayed on the touch screen 18 in such a way that the touched area rotates toward the rear side around a vertical axis of the captured image, as shown in FIG. 5B.

It is noted that the period having lapsed before the CPU 23 detects the touch made by the user's finger f1 is not limited to a specific value, but is preferably at least a fixe value to prevent a wrong operation by the user.

Figure 5C:
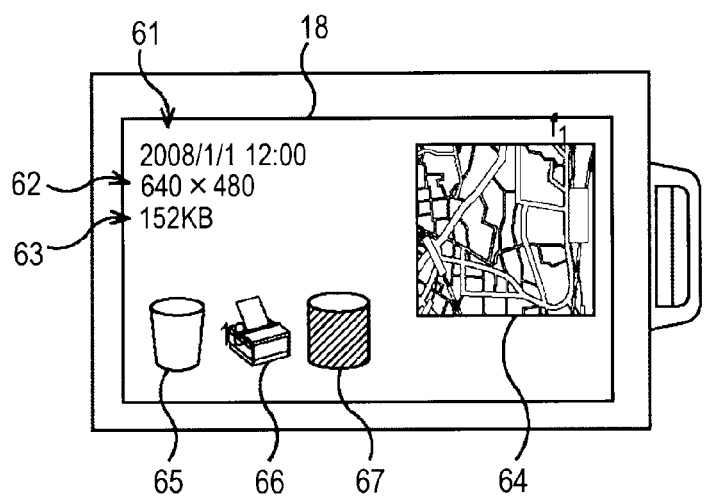

When the touch made by the finger f1 continues in the state of the display shown in FIG. 5B, the state of the display on the touch screen 18 transits from that shown in FIG. 5B to that shown in FIG. 5C. That is, an additional information image is displayed on the touch screen 18.

While the description has been made with reference to the case where the finger f1 touches the left area in FIGS. 5A to 5C, the finger f1 may touch a right area. In this case, the display on the touch screen is produced in such a way that the direction of rotation is opposite to that in FIG. 5B.

Further, the area to be touched by the finger f1 is not limited to a specific area, and the finger f1 may touch an area on the upper or lower side of the touch screen 18. In this case, although not illustrated, the captured image is displayed on the touch screen 18 in such a way that the touched area rotates toward the rear side around a horizontal axis of the captured image.

Figure 6:
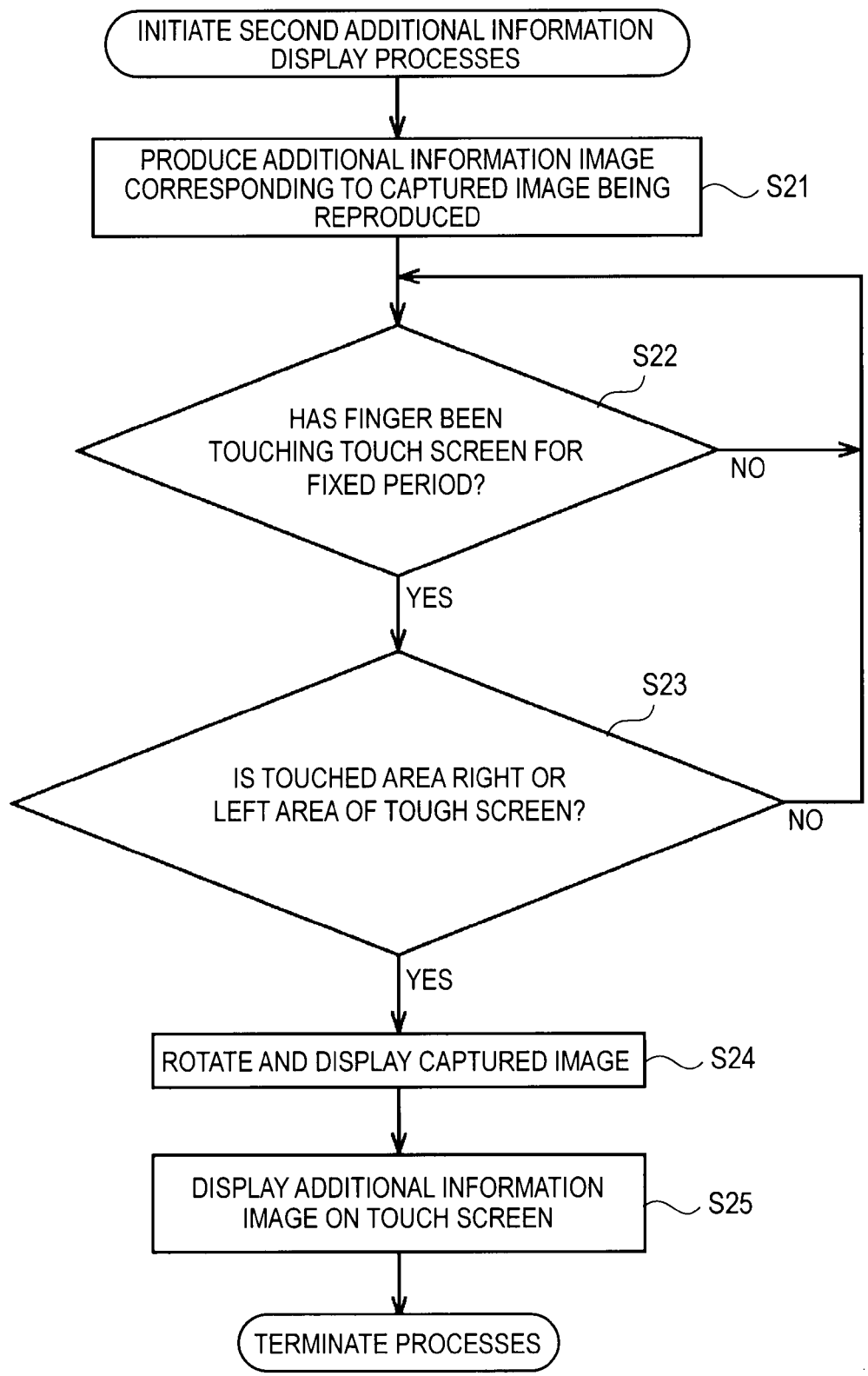
FIG. 6 is a flowchart describing an example of second additional information display processes.

FIG. 6 is a flowchart describing the additional information display processes in the second example of the additional information display operation described with reference to FIGS. 5A to 5C, that is, an example of the second additional information display processes.

In the step S21, the CPU 23 controls the digital signal processor 15 and other components as appropriate to produce an additional information image corresponding to a captured image being reproduced. That is, the additional information contained in the additional information image is acquired.

The additional information image only needs to be produced by the time when the process in the step 25 is initiated. That is, the timing at which the additional information image is produced is not, in particular, necessarily the timing at which the step S21 is carried out.

In the step S22, the CPU 23 judges whether or not the finger f1 touches the touch screen 18 for a fixed period.

That is, when the user's finger f1 touches any area of the touch screen 18, the touch panel 16, which forms the touch screen 18, inputs a coordinate signal to the CPU 23.

When no coordinate signal is inputted to the CPU 23, the judgment in the step S22 is NO and the control returns to the process in the step S22. Even when a coordinate signal is inputted, but the touch has not lasted for the fixed period, the judgment in the step S22 is NO and the control returns to the process in the step S22. That is, the judgment process in the step S22 is repeated unless the CPU 23 keeps receiving a coordinate signal for the fixed period.

Thereafter, when the CPU 23 keeps receiving a coordinate signal for the fixed period, the judgment in the step S22 is YES and the control proceeds to the process in the step S23.

In the step S23, the CPU 23 judges whether or not the touched area is a right or left area of the touch screen 18. It is noted that each of the right and left areas has an arbitrary preset width.

When the touched area is not the right or left area but any of the other areas, the judgment in the step S23 is NO and the control returns to the process in the step S22. The process in the step S22 and the following processes are then repeated.

On the other hand, when the touched area is the right or left area, the judgment in the step S23 is YES and the control proceeds to the process in the step S24.

As described above, the touched area to be judged YES in the process in the step S23 is not, in particular, necessarily those in the example in FIG. 6, that is, the left or right area, but may be an arbitrary area. The touched area is, however, preferably an area that does not cause the user to feel strange when the captured image is rotated and displayed in the process in the step S24, which will be described below. In this sense, other than the right or left area, the touched area is preferably an upper or lower area.

In the step S24, the CPU 23 rotates and displays the captured image. Specifically, for example, the CPU 23 controls the digital signal processor 15 to produce moving images displayed on the touch screen 18 in such a way that the area that has been touched for the fixed period rotates toward the rear side as shown in FIG. 5B. The control then proceeds to the process in the step S25.

In the step S25, the CPU 23 displays the additional information image on the touch screen 18. As a result, the state of the display on the touch screen 18 becomes, for example, that shown in FIG. 5C. The second additional information display processes are completed at this point.

In the state of the display shown in FIG. 5C, that is, when the additional information image is displayed on the touch screen 18, the CPU 23 can switch the display on the touch screen 18 from the additional information image to the captured image, that is, the CPU 23 can change the display on the touch screen 18 back to the state of the display shown in FIG. 5A, by carrying out the same processes as the second additional information display process.

The second example of the additional information display operation of the present embodiment has been described with reference to FIGS. 5A to 5C. An example of the second additional information display processes in the second example has been described with reference to the flowchart shown in FIG. 6.

A third example of the additional information display operation of the present embodiment will be described with reference to FIGS. 7A to 7C. An example of third additional information display processes in the third example will be then described with reference to the flowchart shown in FIG. 8.

In the first and second examples described above, the CPU 23 judges whether or not the finger f1 touches the touch panel 16 based on a coordinate signal inputted from the touch panel 16, which forms the touch screen 18 disposed on the rear side of the imaging apparatus.

In contrast, in the third example, the CPU 23 judges whether or not the finger f1 touches the touch panel 28 based on a coordinate signal inputted from the touch panel 28 disposed on the front side of the imaging apparatus.

Figure 7A:
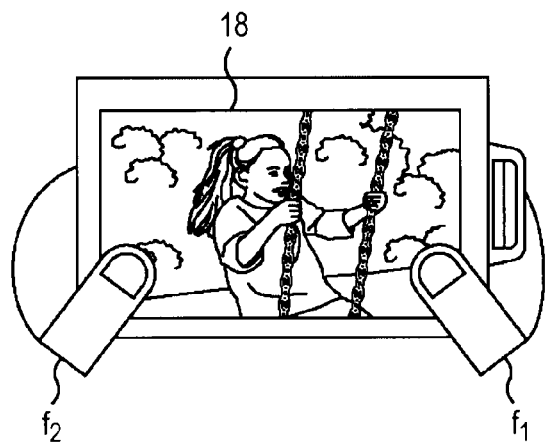
FIGS. 7A to 7C describe a third example of the additional information display operation in the imaging apparatus.

FIG. 7A shows a state in which the user holds the imaging apparatus by both hands and the touch screen 18 displays an arbitrary captured image.

Figure 7B:
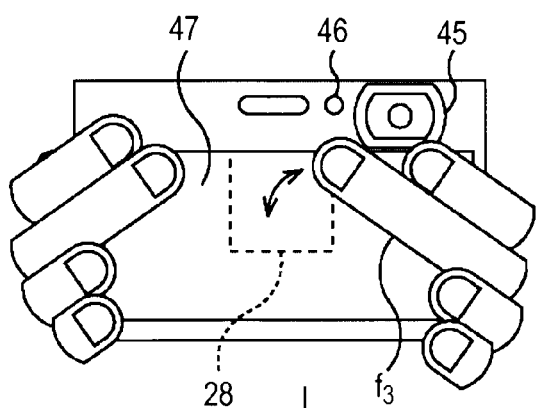

FIG. 7B shows an exemplary exterior configuration of the front side of the imaging apparatus in the state shown in FIG. 7A. It is assumed in the third example that the user holds and operates the imaging apparatus with the thumb disposed on the rear side of the imaging apparatus and the other four fingers other than the thumb disposed on the front side of the imaging apparatus, that is, with the imaging apparatus sandwiched between the thumb and the other four fingers.

In FIG. 7B, the user touches the touch panel 28 with a finger f3. The period having lapsed before the CPU 23 detects the touch made by the user's finger f3 is not limited to a specific value. It is, however, assumed in the following description that the CPU 23 detects the touch made by the finger f3 immediately after a coordinate signal is inputted from the touch panel 28.

The finger used to touch the touch panel 28 is not limited to the finger f3 shown in FIG. 7B. That is, any finger other than the thumb can touch the touch panel 28. In the following description, the finger f3 touches the touch panel 28 to simplify the description.

While the touch panel 28 is disposed in the vicinity of the center of the front surface of the imaging apparatus in the examples shown in FIGS. 2B and 7B, the touch panel 28 is not, in particular, necessarily disposed in the vicinity of the center. The touch panel 28 may even be disposed on a side of the imaging apparatus. As described above, however, when it is assumed that the user holds the imaging apparatus as shown in FIGS. 7A and 7B, the touch panel 28 is preferably disposed at the location shown in FIG. 7B to prevent a wrong operation. That is, the touch panel 28 is preferably disposed at a location where any of the user's fingers will not easily touch the touch panel 28, that is, at a location between both hands of the user, when the user holds the imaging apparatus.

Figure 7C:
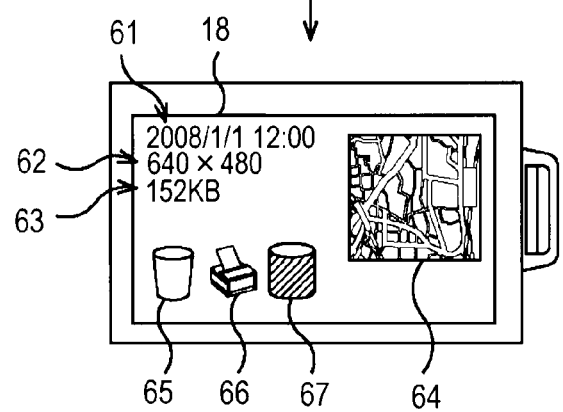

When the finger f3 touches the touch panel 28, the state of the display on the touch screen 18 transits from that shown in FIG. 7A to that shown in FIG. 7C. That is, an additional information image is displayed on the touch screen 18.

FIG. 8 is a flowchart describing the additional information display processes in the third example of the additional information display operation described with reference to FIGS. 7A to 7C, that is, an example of the third additional information display processes.

In the step S31, the CPU 23 controls the digital signal processor 15 and other components as appropriate to produce an additional information image corresponding to a captured image being reproduced. That is, the additional information contained in the additional information image is acquired.

The additional information image only needs to be produced by the time when the process in the step 33 is initiated. That is, the timing at which the additional information image is produced is not, in particular, necessarily the timing at which the step S31 is carried out.

In the step S32, the CPU 23 judges whether or not the finger f3 touches the touch panel 28 on the front side of the imaging apparatus.

That is, when the user's finger f3 touches any area of the touch panel 28, the touch panel 28 inputs a coordinate signal to the CPU 23.

When no coordinate signal is inputted to the CPU 23, the judgment in the step S32 is NO and the control returns to the process in the step S32. That is, the judgment process in the step S32 is repeated unless a coordinate signal is inputted.

Thereafter, when a coordinate signal is inputted, the judgment in the step S32 is YES and the control proceeds to the process in the step S33.

In the step S33, the CPU 23 displays the additional information image on the touch screen 18. As a result, the state of the display on the touch screen 18 becomes, for example, that shown in FIG. 7C. The third additional information display processes are completed at this point.

In the state of the display shown in FIG. 7C, that is, when the additional information image is displayed on the touch screen 18, the CPU 23 can switch the display on the touch screen 18 from the additional information image to the captured image, that is, the CPU 23 can change the display on the touch screen 18 back to the state of the display shown in FIG. 7A, by carrying out the same processes as the third additional information display processes.

The third example of the additional information display operation of the present embodiment has been described with reference to FIGS. 7A to 7C. An example of the third additional information display processes in the third example has been described with reference to the flowchart shown in FIG. 8.

A fourth example of the additional information display operation of the present embodiment will be described with reference to FIGS. 9A and 9B. An example of fourth additional information display processes in the fourth example will then be described with reference to the flowchart shown in FIG. 10.

The first to third examples have been described with reference to the additional information display operation using the touch screen 18 disposed on the rear side of the imaging apparatus or the touch panel 28 disposed on the front side of the imaging apparatus. Specifically, the first to third examples have been described with reference to the additional information display operation in which the user touches the touch screen 18 or the touch panel 28 with the finger f1 or f3 to display an additional information image.

In contrast, the fourth example will be described with reference to an additional information display operation using a gyroscopic sensor built in the imaging apparatus to display an additional information image. The gyroscopic sensor can detect information indicative of inclination of the imaging apparatus, for example, the speed, angle, angular speed, acceleration, and magnetism. In the following description, the information detected by the gyroscopic sensor is collectively referred to as inclination information.

In the following description, an imaging apparatus with a gyroscopic sensor built therein is particularly referred to as a gyroscopic sensor-equipped imaging apparatus. Although not illustrated in the present embodiment, a gyroscopic sensor-equipped imaging apparatus basically has the configuration in the example shown in FIG. 1 but further includes a gyroscopic sensor connected to the CPU 23. In practice, a gyroscopic sensor-equipped imaging apparatus does not need the touch panels 16 and 28.

Figure 9A:
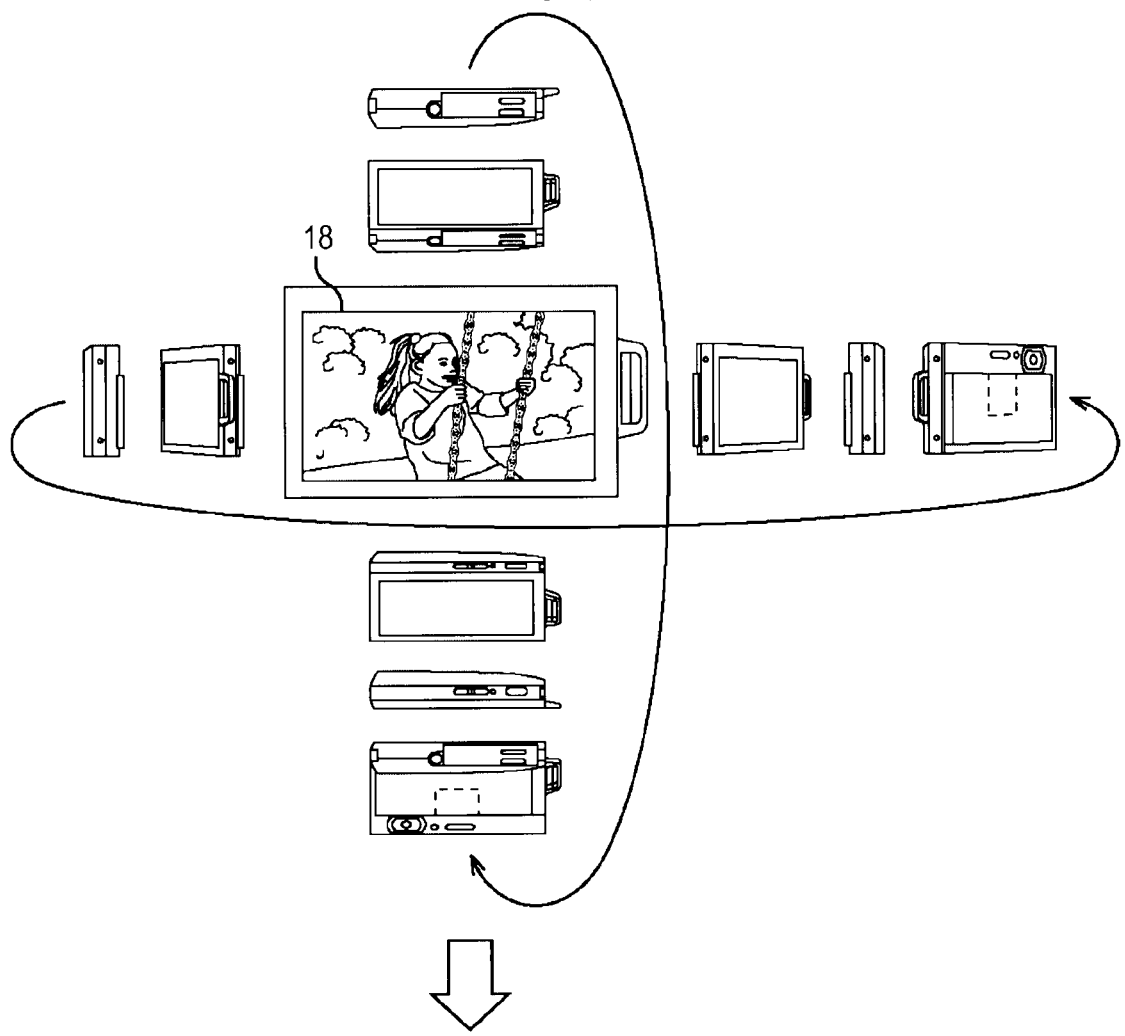
FIGS. 9A and 9B describe a fourth example of the additional information display operation in the imaging apparatus.

FIG. 9A shows that the user rotates a gyroscopic sensor-equipped imaging apparatus in the horizontal or vertical direction and the touch screen 18 of the imaging apparatus displays an arbitrary captured image.

As shown in FIG. 9A, the user rotates the gyroscopic sensor-equipped imaging apparatus 360 degrees in the horizontal or vertical direction. The rotating operation causes the state of the display on the touch screen 18 to transit to that shown in FIG. 9B. That is, an additional information image is displayed on the touch screen 18.

Figure 9B:
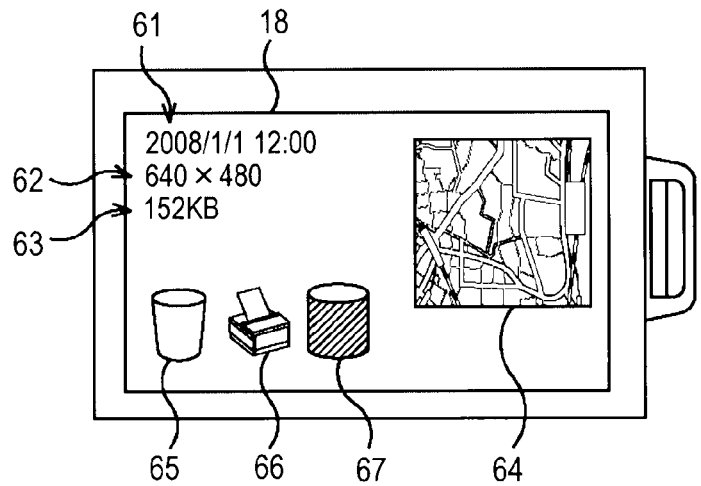

In the state of the display shown in FIG. 9B, that is, when the additional information image is displayed on the touch screen 18, the user can rotate the gyroscopic sensor-equipped imaging apparatus 360 degrees in the horizontal or vertical direction. The rotating operation switches the display on the touch screen 18 from the additional information image to the captured image.

That is, rotating the gyroscopic sensor-equipped imaging apparatus 360 degrees in the horizontal or vertical direction switches the display on the touch screen 18 from the additional information image or the captured image to the other.

Figure 10:
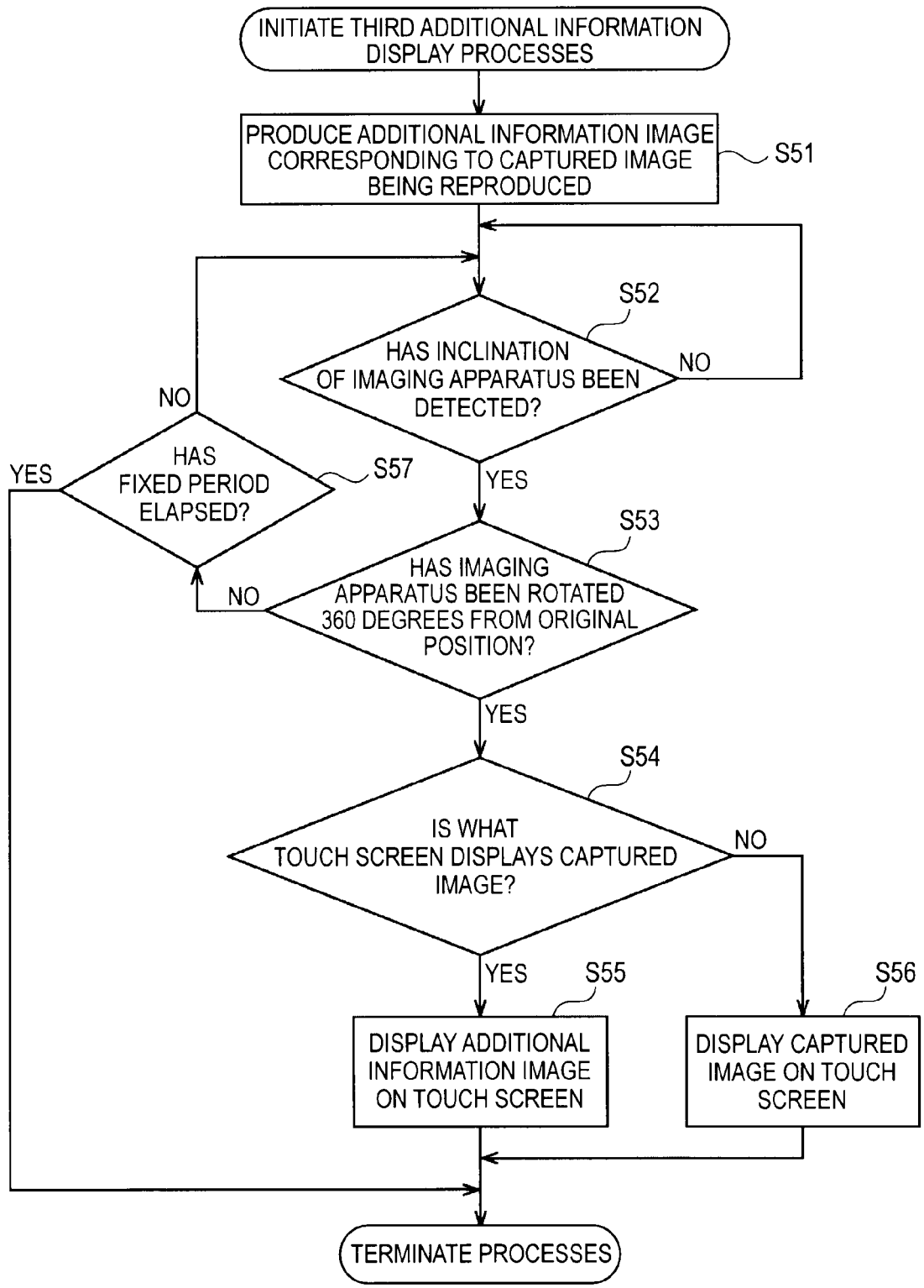
FIG. 10 is a flowchart describing an example of fourth additional information display processes.

FIG. 10 is a flowchart describing the additional information display processes in the fourth example of the additional information display operation described with reference to FIGS. 9A and 9B, that is, an example of the fourth additional information display processes.

In the step S51, the CPU 23 controls the digital signal processor 15 and other components as appropriate to produce an additional information image corresponding to a captured image being reproduced. That is, the additional information contained in the additional information image is acquired.

The additional information image only needs to be produced by the time when the process in the step 55 is initiated. That is, the timing at which the additional information image is produced is not, in particular, necessarily the timing at which the step S51 is carried out.

In the step S52, the CPU 23 judges whether or not the inclination of the gyroscopic sensor-equipped imaging apparatus has been detected.

That is, when the gyroscopic sensor-equipped imaging apparatus is inclined, the gyroscopic sensor inputs inclination information to the CPU 23.

Therefore, unless the gyroscopic sensor inputs inclination information, the judgment in the step S52 is NO and the control returns to the process in the step S52. That is, the judgment process in the step S52 is repeated until the gyroscopic sensor inputs inclination information.

Thereafter, when the gyroscopic sensor inputs inclination information, the judgment in the step S52 is YES and the control proceeds to the process in the step S53.

In the step S53, the CPU 23 judges whether or not the gyroscopic sensor-equipped imaging apparatus has been rotated 360 degrees in the horizontal or vertical direction from the original position. The original position herein means the attitude of the gyroscopic sensor-equipped imaging apparatus before it is inclined by the user. That is, the original position is the attitude of the imaging apparatus held by the user in such a way that the user faces the touch screen 18 (the rear side of the imaging apparatus).

During the rotation of the gyroscopic sensor-equipped imaging apparatus, the angle of rotation made by the gyroscopic sensor-equipped imaging apparatus is smaller than 360 degrees. Therefore, in this case, the judgment in the step S53 is NO and the control proceeds to the process in the step S57.

In the step S57, the CPU 23 judges whether or not a fixed period has elapsed since the CPU 23 detected the inclination of the gyroscopic sensor-equipped imaging apparatus.

When the fixed period has elapsed, the judgment in the step S57 is YES and the fourth additional information display processes are terminated.

That is, the user should be able to rotate the gyroscopic sensor-equipped imaging apparatus 360 degrees approximately in several seconds. When the gyroscopic sensor-equipped imaging apparatus has not been rotated 360 degrees even after the fixed period, for example, approximately 10 seconds, has elapsed, it is judged that the user does not intend to rotate the imaging apparatus, and the CPU 23 terminates the fourth additional information display processes.

When the fixed period has not elapsed, it is judged that the user still intends to rotate the imaging apparatus. The judgment in the step S57 is NO, and the control returns to the process in the step S52.

That is, unless the fixed period has elapsed, and when the user is rotating the gyroscopic sensor-equipped imaging apparatus 360 degrees in the horizontal or vertical direction, the loop process including YES in the step S52, NO in the step S53, and NO in the step S57 is repeated.

Thereafter, when the gyroscopic sensor-equipped imaging apparatus has been rotated 360 degrees before the fixed period elapses, the judgment in the step S53 is YES and the control proceeds to the process in the step S54.

In the step S54, the CPU 23 judges whether or not what the touch screen 18 displays is the captured image.

When what the touch screen 18 displays is the captured image, the judgment in the step S54 is YES and the control proceeds to the process in the step S55. In the step S55, the CPU 23 controls the digital signal processor 15 to display the additional information image on the touch screen 18. That is, rotating the gyroscopic sensor-equipped imaging apparatus 360 degrees in the horizontal or vertical direction switches the display on the touch screen 18 from the captured image to the additional information image. The fourth additional information display processes are completed at this point. Thereafter, when the fourth additional information display processes are resumed, the process in the step S56, which will be described below, switches the display on the touch screen 18 from the additional information image to the captured image.

On the other hand, when what the touch screen 18 displays is not the captured image but the additional information image, the judgment in the step S54 is NO and the control proceeds to the process in the step S56. In the step S56, the CPU 23 controls the digital signal processor 15 to display the captured image on the touch screen 18. That is, rotating the gyroscopic sensor-equipped imaging apparatus 360 degrees in the horizontal or vertical direction switches the display on the touch screen 18 from the additional information image to the captured image. The fourth additional information display processes are completed at this point. Thereafter, when the fourth additional information display processes are resumed, the process in the step S55, which has been described above, switches the display on the touch screen 18 from the captured image to the additional information image.

The fourth example of the additional information display operation of the present embodiment has been described with reference to FIGS. 9A and 9B. An example of the fourth additional information display processes in the fourth example has been described with reference to the flowchart shown in FIG. 10.

A fifth example of the additional information display operation of the present embodiment will be described with reference to FIGS. 11A to 11C. An example of fifth additional information display processes in the fifth example will then be described with reference to the flowchart shown in FIG. 12.

In the fifth example, a gyroscopic sensor-equipped imaging apparatus is used as the imaging apparatus, as in the case of the fourth example. That is, the fifth example is the same as the fourth example in that the gyroscopic sensor detects the inclination of the imaging apparatus and an additional information image is displayed based on the detection result, but the above operation in the fifth example is performed differently from the fourth example.

That is, in the fourth example, an additional information image is displayed by rotating the gyroscopic sensor-equipped imaging apparatus 360 degrees. In contrast, in the fifth example, an additional information image is displayed by rotating the gyroscopic sensor-equipped imaging apparatus 180 or 90 degrees and then further rotating the gyroscopic sensor-equipped imaging apparatus 180 or 90 degrees in the opposite direction, that is, putting the gyroscopic sensor-equipped imaging apparatus back to the original position.

Figure 11A:
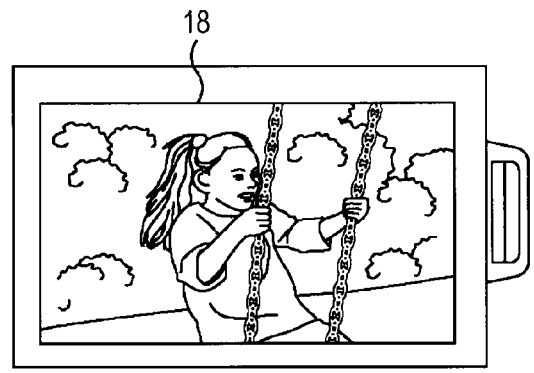
FIGS. 11A to 11C describe a fifth example of the additional information display operation in the imaging apparatus.

FIG. 11A shows a state in which the touch screen 18 displays an arbitrary captured image.

Figure 11B:
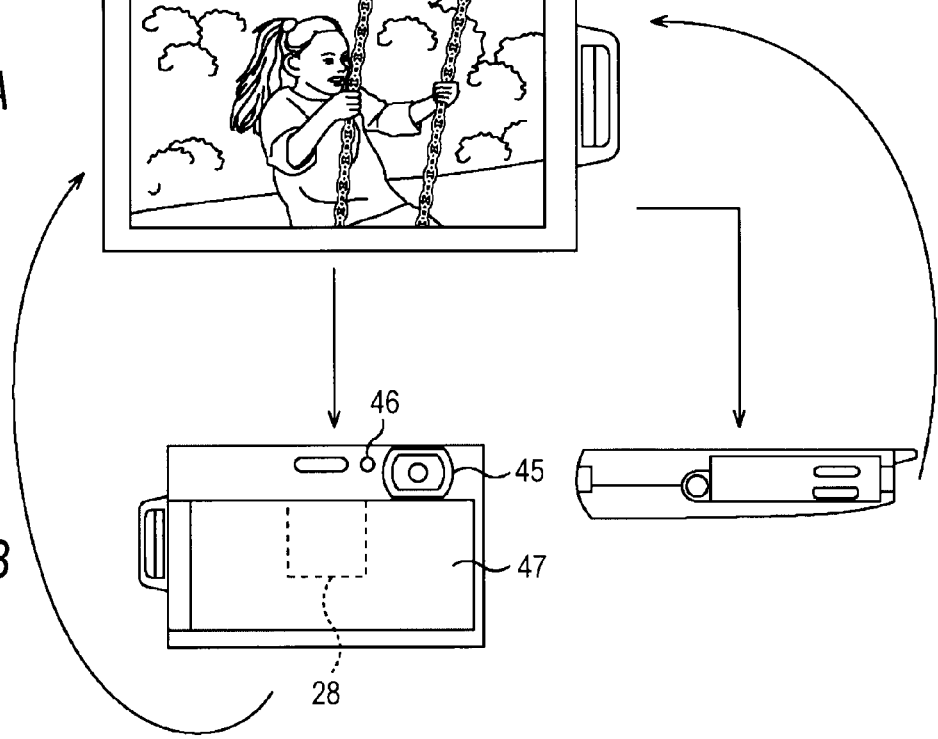

The left portion of FIG. 11B shows a state in which the user has rotated the gyroscopic sensor-equipped imaging apparatus 180 degrees from the state shown in FIG. 11A.

Figure 11C:
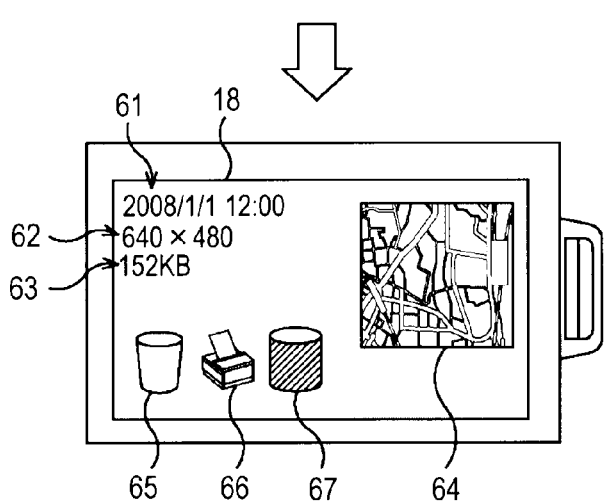

Putting again the gyroscopic sensor-equipped imaging apparatus disposed as shown in the left portion of FIG. 11B back to the state shown in FIG. 11A causes the state of the display on the touch screen 18 to transit from that shown in FIG. 11A to that shown in FIG. 11C. That is, the touch screen 18 displays an additional information image.

The right portion of FIG. 11B shows a state in which the user has rotated the gyroscopic sensor-equipped imaging apparatus 90 degrees from the state shown in FIG. 11A.

Putting again the gyroscopic sensor-equipped imaging apparatus disposed as shown in the right portion of FIG. 11B back to the state shown in FIG. 11A causes the state of the display on the touch screen 18 to transit from that shown in FIG. 11A to that shown in FIG. 11C. That is, the touch screen 18 displays an additional information image.

In the fifth example as well as in the fourth example, when the state of the display on the touch screen 18 is that shown in FIG. 11C, that is, when the additional information image is displayed, the user can carry out the same rotating operation described above, that is, rotation of 180 or 90 degrees, and then rotation of 180 or 90 degrees in the opposite direction. This rotating operation causes the state of the display on the touch screen 18 to transit from that shown in FIG. 11C to that shown in FIG. 11A. That is, the touch screen 18 displays the captured image.

FIG. 12 is a flowchart describing the additional information display processes in the fifth example of the additional information display operation described with reference to FIGS. 11A to 11C, that is, an example of the fifth additional information display processes.

In the step S71, the CPU 23 controls the digital signal processor 15 and other components as appropriate to produce an additional information image corresponding to a captured image being reproduced. That is, the additional information contained in the additional information image is acquired.

The additional information image only needs to be produced by the time when the process in the step S76 is initiated. That is, the timing at which the additional information image is produced is not, in particular, necessarily the timing at which the step S71 is carried out.

In the step S72, the CPU 23 judges whether or not the inclination of the gyroscopic sensor-equipped imaging apparatus has been detected.

That is, when the gyroscopic sensor-equipped imaging apparatus is inclined, the gyroscopic sensor inputs inclination information to the CPU 23.

Therefore, unless the gyroscopic sensor inputs inclination information, the judgment in the step S72 is NO and the control returns to the process in the step S72. That is, the judgment process in the step S72 is repeated until the gyroscopic sensor inputs inclination information.

Thereafter, when the gyroscopic sensor inputs inclination information, the judgment in the step S72 is YES and the control proceeds to the process in the step S73.

In the step S73, the CPU 23 judges whether or not the gyroscopic sensor-equipped imaging apparatus has been rotated 180 or 90 degrees in the horizontal or vertical direction from the original position. The original position herein means the attitude of the gyroscopic sensor-equipped imaging apparatus before it is inclined by the user. That is, the original position is the attitude of the imaging apparatus held by the user in such a way that the user faces the touch screen 18 (the rear side of the imaging apparatus).

During the rotation of the gyroscopic sensor-equipped imaging apparatus, the judgment in the step S73 is NO and the control proceeds to the process in the step S78, as in the case of the fourth additional information display processes shown in FIG. 10.

In the step S78, the CPU 23 judges whether or not a fixed period has elapsed since the CPU 23 detected the inclination of the gyroscopic sensor-equipped imaging apparatus.

When the fixed period has elapsed, the judgment in the step S78 is YES and the fifth additional information display processes are terminated.

That is, the user should be able to rotate the gyroscopic sensor-equipped imaging apparatus approximately in several seconds. When the gyroscopic sensor-equipped imaging apparatus has not been rotated even after the fixed period, for example, approximately 10 seconds, has elapsed, it is judged that the user does not intend to rotate the imaging apparatus, and the CPU 23 terminates the fifth additional information display processes.

When the fixed period has not elapsed, it is judged that the user still intends to rotate the imaging apparatus. The judgment in the step S78 is NO, and the control returns to the process in the step S72.

That is, unless the fixed period has elapsed, and when the user is rotating the gyroscopic sensor-equipped imaging apparatus, the loop process including YES in the step S72, NO in the step S73, and NO in the step S78 is repeated.

Thereafter, when the gyroscopic sensor-equipped imaging apparatus has been rotated 180 or 90 degrees before the fixed period elapses, the judgment in the step S73 is YES and the control proceeds to the process in the step S74.

According to the fifth additional information display operation, the user should then put the gyroscopic sensor-equipped imaging apparatus back to the original position, that is, the user should rotate the gyroscopic sensor-equipped imaging apparatus 180 or 90 degrees in the opposite direction (hereinafter referred to as a reverse rotating operation).

In the step S74, the CPU 23 judges whether or not the gyroscopic sensor-equipped imaging apparatus has been put back to the original position. That is, in the step S74, the CPU 23 judges whether or not the gyroscopic sensor-equipped imaging apparatus has been reversely rotated 180 or 90 degrees in the horizontal or vertical direction.

When the gyroscopic sensor-equipped imaging apparatus is reversely being rotated, the judgment in the step S74 is NO and the control proceeds to the process in the step S78, as in the case of the judgment process in the step S73.

In the step S78, the CPU 23 judges whether or not the fixed period has elapsed since the CPU 23 detected the inclination of the gyroscopic sensor-equipped imaging apparatus.

When the fixed period has elapsed, the judgment in the step S78 is YES and the fifth additional information display processes are terminated.

On the other hand, when the fixed period has not elapsed, it is judged that the user still intends to reversely rotate the imaging apparatus. The judgment in the step S78 is NO, and the control returns to the process in the step S72.

That is, unless the fixed period has elapsed, and when the user is reversely rotating the gyroscopic sensor-equipped imaging apparatus, the loop process including YES in the step S72, YES in the step S73, NO in the step S74, and NO in the step S78 is repeated.

Thereafter, when the gyroscopic sensor-equipped imaging apparatus has been rotated 180 or 90 degrees before the fixed period elapses, the judgment in the step S74 is YES and the control proceeds to the process in the step S75.

In the step S75, the CPU 23 judges whether or not what the touch screen 18 displays is the captured image.

When what the touch screen 18 displays is the captured image, the judgment in the step S75 is YES and the control proceeds to the process in the step S76. In the step S76, the CPU 23 controls the digital signal processor 15 to display the additional information image on the touch screen 18. That is, rotating the gyroscopic sensor-equipped imaging apparatus 180 or 90 degrees in the horizontal or vertical direction and rotating it by the same amount in the opposite direction switch the display on the touch screen 18 from the captured image to the additional information image. The fifth additional information display processes are completed at this point. Thereafter, when the fifth additional information display processes are resumed, the process in the step S77, which will be described below, switches the display on the touch screen 18 from the additional information image to the captured image.

On the other hand, when what the touch screen 18 displays is not the captured image but the additional information image, the judgment in the step S75 is NO and the control proceeds to the process in the step S77. In the step S77, the CPU 23 controls the digital signal processor 15 to display the captured image on the touch screen 18. That is, rotating the gyroscopic sensor-equipped imaging apparatus 180 or 90 degrees in the horizontal or vertical direction and rotating it by the same amount in the opposite direction switch the display on the touch screen 18 from the additional information image to the captured image. The fifth additional information display processes are completed at this point. Thereafter, when the fifth additional information display processes are resumed, the process in the step S76, which has been described above, switches the display on the touch screen 18 from the captured image to the additional information image.

The first to fifth examples of the additional information display operation have been described above with reference to the case where an additional information image corresponding to a captured image is displayed on the touch screen 18. It is assumed in the first to fifth examples that the captured image and the additional information image have a one-to-one relationship. That is, since a card in the real life is mimicked in the first to fifth examples, it is assumed that the captured image and the additional information image are the two sides of the same card.

However, it is conceivable that a single captured image has multiple additional information images and associated images. It is therefore preferable that the user can display multiple pieces of additional information and associated images for a single captured image. This operation is hereinafter referred to as an additional information/others display operation.

An example of the additional information/others display operation will be described with reference to FIGS. 13A to 13E. The description below will be made by assuming that basic additional information/others display operation in the example shown in FIGS. 13A to 13E is the same as the additional information display operations in the second, fourth, and fifth examples.

FIG. 13A shows a state in which the touch screen 18 displays an arbitrary captured image.

FIG. 13B shows that the state of the display on the touch screen 18 transits to a state in which a first additional information image, which is one of multiple additional information images, is displayed by virtually rotating the touch screen 18 leftward around a vertical axis when the touch screen 18 has the state of the display shown in FIG. 13A.

The virtual leftward rotating operation around a vertical axis used herein is an operation performed as if the captured image is rotated leftward around a vertical axis, and the operations in the second, fourth, and fifth examples are collectively called the virtual leftward rotating operation around a vertical axis.

That is, in the second embodiment, the virtual leftward rotating operation around a vertical axis is an operation in which the user keeps touching the left area of the touch screen 18 with the finger f1 for a fixed period.

In the fourth embodiment, the virtual leftward rotating operation around a vertical axis is an operation in which the user rotates the imaging apparatus 360 degrees leftward around a vertical axis in the horizontal direction.

In the fifth embodiment, the virtual leftward rotating operation around a vertical axis is an operation in which the user rotates the imaging apparatus 180 or 90 degrees leftward around a vertical axis in the horizontal direction and then reversely rotates the imaging apparatus 180 or 90 degrees rightward around the vertical axis to put the imaging apparatus back to the original position.

FIG. 13C shows that the state of the display on the touch screen 18 transits to a state in which a second additional information image, which differs from the first additional information image, is displayed by further virtually rotating the touch screen 18 leftward around the vertical axis when the touch screen 18 has the state of the display shown in FIG. 13B.

FIG. 13D shows that the state of the display on the touch screen 18 transits to a state in which a first associated image, which is one of multiple associated images, is displayed by virtually rotating the touch screen 18 rightward around a vertical axis when the touch screen 18 has the state of the display shown in FIG. 13A.

The virtual rightward rotating operation around a vertical axis used herein is an operation performed as if the captured image is rotated rightward around a vertical axis, and the operations in the second, fourth, and fifth examples are collectively called the virtual rightward rotating operation around a vertical axis.

That is, in the second embodiment, the virtual rightward rotating operation around a vertical axis is an operation in which the user keeps touching the right area of the touch screen 18 with the finger f1 for a fixed period.

In the fourth embodiment, the virtual rightward rotating operation around a vertical axis is an operation in which the user rotates the imaging apparatus 360 degrees rightward around a vertical axis in the horizontal direction.

In the fifth embodiment, the virtual rightward rotating operation around a vertical axis is an operation in which the user rotates the imaging apparatus 180 or 90 degrees rightward around a vertical axis in the horizontal direction and then reversely rotates the imaging apparatus 180 or 90 degrees leftward around the vertical axis to put the imaging apparatus back to the original position.

FIG. 13E shows that the state of the display on the touch screen 18 transits to a state in which a second associated image, which differs from the first associated images, is displayed by further virtually rotating the touch screen 18 rightward around the vertical axis when the touch screen 18 has the state of the display shown in FIG. 13D.

The additional information/others display operations shown in FIGS. 13A to 13E are not particularly limited to the horizontally rotating operations, but may be vertically rotating operations. In this case, the captured image shown in FIG. 13A undergoes a virtual upward or downward rotating operation around a horizontal axis, whereby the state of the display on the touch screen 18 transits to a state in which a variety of pieces of additional information and associated images are displayed.

In the example shown in FIGS. 13A to 13E, the additional information images are displayed by carrying out the leftward rotation around a vertical axis or the upward rotation around a horizontal axis, and the associated images are displayed by carrying out the rightward rotation around a vertical axis or the downward rotation around a horizontal axis. However, images displayed by the variety of operations are, of course, not limited to those in the above examples.

The series of processes described above may be carried out by hardware or software.

In this case, the series of processes described above may of course be carried out by the imaging apparatus shown in FIG. 1, or may be carried out, for example, by a personal computer shown in FIG. 14.

In FIG. 14, a CPU 101 carries out a variety of processes in accordance with programs recorded in a ROM (Read Only Memory) 102 or programs loaded from a storage unit 108 to a RAM (Random Access Memory) 103. Further, the RAM 103 as appropriate stores data necessary for the CPU 101 to carry out the variety of processes.

The CPU 101, the ROM 102, and the RAM 103 are connected to one another via a bus 104. An input/output interface 105 is also connected to the bus 104.

The input/output interface 105 is connected to an input unit 106 formed of a keyboard, a mouse, and other components, an output unit 107, the storage unit 108 formed of a hard disc drive and other components, and a communication unit 109 formed of a modem, a terminal adapter, and other components. The communication unit 109 controls communication with other apparatus (not shown) via a network including the Internet.

The input/output interface 105 is also connected to a drive 110 as necessary, into which a removable medium 111, such as a magnetic disk, an optical disk, a magneto-optical disc, and a semiconductor memory, is loaded as appropriate. Computer programs read from any of the above media are installed in the storage unit 108 as necessary.

When the series of processes are carried out by software, programs that form the software are installed via the network or by any of the recording media, for example, to a computer incorporated in dedicated hardware or a general-purpose personal computer that can perform a variety of functions by installing a variety of programs.

As shown in FIG. 1 or 14, recording media containing such programs are formed of not only the removable medium (packaged medium) 111 (FIG. 14) distributed to users to provide the programs separately from the apparatus body, such as a magnetic disk (including a floppy disk), an optical disk (including a CD-ROM (Compact Disk-Read Only Memory) and a DVD (Digital Versatile Disk)), a magneto-optical disk (including an MD (Mini-Disk)), and a semiconductor memory, on which the programs are recorded, but also the program ROM 26 shown in FIG. 1, the ROM 102, a hard disk contained in the storage unit 108 shown in FIG. 14, and other components, which are incorporated in advance in the apparatus body and provided to the users and on which the programs are recorded.

In the present specification, the steps describing the programs recorded in any of the storage media include not only processes that are sequentially carried out in a time-series manner but also processes that are not necessarily carried out in a time-series manner but are carried out concurrently or individually.

The above description has been made with reference to the case where a display device in which the display operation is controlled by the information processing apparatus to which the invention is applied is a liquid crystal display device, specifically, the liquid crystal display panel 17. The invention is also applicable to not only a liquid crystal display panel but also a display device in which the display operation is instructed on a frame or field basis (frames or fields form video images and each of the frames or fields is hereinafter referred to as a displaying unit); a plurality of pixels that form a single displaying unit are formed of display elements; and at least part of the display elements can remain in a display state. The display elements described above are hereinafter referred to as hold-type display elements, and a display device having a screen formed of hold-type display elements is referred to as a hold-type display device. That is, a liquid crystal display device has been presented only by way of example of a hold-type display device, and the invention is applicable to any hold-type display device.

The invention is further applicable to not only a hold-type display device but also, for example, a flat-panel, self-luminous display device using organic EL (Electro Luminescent) devices as light-emitting elements. That is, the invention is applicable to any display device including display elements that display a plurality of pixels that form an image. The display device described above is referred to as a pixel-type display device. In a pixel-type display device, a single pixel is not, in particular, necessarily related to a single display element.

In other words, a display device in which the display operation is controlled by the information processing apparatus to which the invention is applied only needs to be a display device capable of carrying out the series of processes described above.

The present application contains subject matter related to that disclosed in Japanese Priority Patent Application JP 2008-197215 filed in the Japan Patent Office on Jul. 31, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   a display configured to, in a first display state, display an image as a front side of a card, and in a second display state, display an additional information image including additional information associated with the image as a rear side of the card;
   a touch sensor configured to detect a predetermined touch operation performed on the display;
   a rotation sensor configured to detect an inclination of the information processing apparatus; and
   a circuit configured to:
   determine whether the display is in the first display state or the second display state;
   determine whether a predetermined period of time has elapsed; and
   control the display to transition between the first display state and the second display state, wherein
   when the touch sensor detects the predetermined touch operation on the display and the circuit determines that the display is in the first display state, the circuit is configured to control the display to transition from the first display state to the second display state,
   when the touch sensor detects the predetermined touch operation on the display and the circuit determines that the display is in the second display state, the circuit is configured to control the display to transition from the second display state to the first display state,
   when the circuit determines that the display is in the first display state, the circuit is configured to control the display to transition from the first display state to the second display state when the rotation sensor detects a first rotation of the information processing apparatus of 90 degrees from an original orientation, the rotation sensor detects a second rotation of the information processing apparatus so that the information processing apparatus returns to the original orientation, and the circuit determines that the predetermined period of time has not elapsed,
   when the circuit determines that the display is in the second display state, the circuit is configured to control the display to transition from the second display state to the first state of display when the rotation sensor detects the first rotation of the information processing apparatus of 90 degrees from the original orientation, the rotation sensor detects the second rotation of the information processing apparatus so that the information processing apparatus returns to the original orientation, and the circuit determines that the predetermined period of time has not elapsed, and
   the predetermined period of time is measured from a beginning of the first rotation to a completion of the second rotation.

2. The information processing apparatus according to claim 1, wherein the circuit is configured to control the display to transition between the first display state and the second display state when the touch sensor detects a touch operation in a predetermined area for at least a second predetermined period of time.

3. The information processing apparatus according to claim 1, wherein
   the display and the touch sensor are disposed on a first surface of the information processing apparatus,
   the information processing apparatus further comprises a touch panel disposed on a second surface of the information processing apparatus opposite the first surface, and
   the circuit is configured to control the display to transition between the first display state and the second display state when the touch sensor detects a touch operation in a predetermined area of the display.

4. The information processing apparatus according to claim 1, wherein the circuit is further configured to control the display to transition between the first display state and the second display state when the rotation sensor detects a rotation of the information processing apparatus of 360 degrees and the circuit determines that the predetermined period of time has not elapsed.

5. The information processing apparatus according to claim 1, wherein circuit is further configured to control the display to transition between the first display state and the second display state when the rotation sensor detects a rotation of the information processing apparatus of 180 degrees followed by another operation of the information processing apparatus of 180 degrees, returning the information processing apparatus to the original orientation, and the circuit determines that the predetermined period of time has not elapsed.

6. The information processing apparatus according to claim 1, wherein, when the state of display on the display is the first display state, the circuit is configured to acquire the additional information to be displayed in the additional information image.

7. The information processing apparatus according to claim 1, wherein
when the circuit determines that the display is in the first display state and the touch sensor detects a touch operation in a border of the display, the display is configured to display the image and an additional information access entrance at the border of the image, and
the predetermined touch operation is configured as a tracing operation in which a touch on the display at a location of the additional information access entrance is moved a predetermined distance while the touch remains on the display.

8. The information processing apparatus according to claim 7, wherein the circuit is configured to control a change of a rate at which the image is reduced on the display in accordance with a path of the touch in the tracing operation while the changing image is displayed on the display.

9. The information processing apparatus according to claim 8, wherein the circuit is configured to change the rate at which the image is reduced in a horizontal direction to successively display reductions of the image in accordance with the path of the touch in the tracing operation.

10. The information processing apparatus according to claim 7, wherein the tracing operation is in a substantially horizontal direction.

11. An information processing method used with an information processing apparatus including:
a display configured to, in a first display state, display an image as a front side of a card, and in a second display state, display an additional information image including additional information associated with the image as a rear side of the card;
a touch sensor; and
a rotation sensor,
the information processing method comprising:
detecting an inclination of the information processing apparatus;
detecting a predetermined touch operation performed on the display;
determining whether the display is in the first display state or the second display state;
determining whether a predetermined period of time has elapsed;
controlling the display to transition from the first display state to the second display state when the predetermined touch operation on the display is detected and the display is in the first display state,
controlling the display to transition from the second display state to the first display state when the predetermined touch operation on the display is detected and the display is in the second display state,
controlling the display to transition from the first display state to the second display state when a first rotation of 90 degrees from an original orientation of the information processing apparatus is detected, a second rotation that returns the information processing apparatus to the original orientation is detected, the predetermined period of time has not elapsed and the display is in the first display state, and
controlling the display to transition from the second display state to the first display state when the first rotation of 90 degrees from the original orientation of the information processing apparatus is detected, the second rotation that returns the information processing apparatus to the original orientation is detected, the predetermined period of time has not elapsed and the display is in the second display state, wherein
the predetermined period of time is measured from a beginning of the first rotation to a completion of the second rotation.

12. The information processing method according to claim 11, further comprising:
controlling the display to display the image and an additional information access entrance at the border of the image when the display is in the first display state and a touch operation is detected in a border of the display, and
detecting the predetermined touch operation as a tracing operation in which a touch on the display at a location of the additional information access entrance is moved a predetermined distance while the touch remains on the display.

13. The information processing method according to claim 12, further comprising controlling a change of a rate at which the image is reduced on the display in accordance with a path of the touch in the tracing operation while the changing image is displayed on the display.

14. The information processing method according to claim 13, further comprising changing the rate at which the image is reduced in a horizontal direction to successively display reductions of the image in accordance with the path of the touch in the tracing operation.

15. The information processing method according to claim 12, wherein the tracing operation is in a substantially horizontal direction.

16. The information processing method according to claim 11, further comprising controlling the display to transition between the first display state and the second display state when the touch sensor detects a touch operation in a predetermined area for at least a second predetermined period of time.

17. The information processing method according to claim 11, wherein
the display and the touch sensor are disposed on a first surface of the information processing apparatus,
the information processing apparatus further comprises a touch panel disposed on a second surface of the information processing apparatus opposite the first surface, and
the method further comprises controlling the display to transition between the first display state and the second display state when a touch operation is detected in a predetermined area of the display.

18. The information processing method according to claim 11, further comprising controlling the display to transition between the first display state and the second display state when a rotation of the information processing apparatus of 360 degrees is detected and the predetermined period of time has not elapsed.

19. The information processing method according to claim 11, further comprising controlling the display to transition between the first display state and the second display state when a rotation of the information processing apparatus of 180 degrees followed by another operation of the information processing apparatus of 180 degrees, returning the information processing apparatus to the original orientation, are detected and the predetermined period of time has not elapsed.

20. The information processing method according to claim 11, further comprising:
when the state of display on the display is the first display state, acquiring the additional information to be displayed in the additional information image.

21. A non-transitory computer readable medium storing a program for causing a computer controlling an information processing apparatus to execute a control process, the information processing apparatus including:
a display configured to, in a first display state, display an image as a front side of a card, and in a second display state, display an additional information image including additional information associated with the image as a rear side of the card;
a touch sensor; and
a rotation sensor,
the control process comprising:
detecting an inclination of the information processing apparatus;
detecting a predetermined touch operation performed on the display;
determining whether the display is in the first display state or the second display state;
determining whether a predetermined period of time has elapsed;
controlling the display to transition from the first display state to the second display state when the predetermined touch operation on the display is detected and the display is in the first display state,
controlling the display to transition from the second display state to the first display state when the predetermined touch operation on the display is detected and the display is in the second display state,
controlling the display to transition from the first display state to the second display state when a first rotation of 90 degrees from an original orientation of the information processing apparatus is detected, a second rotation that returns the information processing apparatus to the original orientation is detected, the predetermined period of time has not elapsed and the display is in the first display state, and
controlling the display to transition from the second display state to the first display state when the first rotation of 90 degrees from the original orientation of the information processing apparatus is detected, the second rotation that returns the information processing apparatus to the original orientation is detected, the predetermined period of time has not elapsed and the display is in the second display state, wherein
the predetermined period of time is measured from a beginning of the first rotation to a completion of the second rotation.

* * * * *